United States Patent [19]
Brandt et al.

[11] Patent Number: 5,892,905
[45] Date of Patent: Apr. 6, 1999

[54] COMPUTER APPARATUS AND METHOD FOR PROVIDING A COMMON USER INTERFACE FOR SOFTWARE APPLICATIONS ACCESSED VIA THE WORLD-WIDE WEB

[75] Inventors: Marcia Lynn Brandt; Kenneth Edgar Brown, both of Rochester; Pernell James Dykes, Byron; Erik Duane Lindberg; Diane Elaine Olson, both of Rochester, all of Minn.; Jeffrey Edward Selden, Jacksonville Beach, Fla.; Devon Daniel Snyder; James Orrin Walts, both of Rochester, Minn.

[73] Assignee: International Business Machines Corporation, Armonk, N.Y.

[21] Appl. No.: 780,015

[22] Filed: Dec. 23, 1996

[51] Int. Cl.⁶ .............................. G06F 17/00; H04L 9/00
[52] U.S. Cl. .............. 395/187.01; 395/186; 395/200.32; 395/200.59
[58] Field of Search .............................. 395/186, 187.01, 395/200.32, 200.59

[56] References Cited

U.S. PATENT DOCUMENTS

| | | | |
|---|---|---|---|
| 5,305,456 | 4/1994 | Boitana | 395/186 |
| 5,361,359 | 11/1994 | Tajalli et al. | 395/186 |
| 5,553,239 | 9/1996 | Heath et al. | 395/187.01 |
| 5,572,643 | 11/1996 | Judson | 395/200.48 |
| 5,701,451 | 12/1997 | Rogers et al. | |
| 5,706,427 | 1/1998 | Tabuki | 395/187.01 |

Primary Examiner—Ly Hua
Attorney, Agent, or Firm—Derek P. Martin

[57] ABSTRACT

The present invention provides the capability to easily access many different application programs over the WWW via a common user interface. By providing standard procedures, routines, tools, and software "hooks" for accessing software applications over the WWW, software developers can concentrate on the functionality of the application program and easily use HTML to provide a GUI interface for the application program. HTML is a well-known language which can be used by almost any computer system on the market today. In addition, since HTML is a fairly well controlled and standardized language, new software application features can be added as they are developed and supported by HTML. In addition, since HTML is a widely adopted, non-proprietary technology, the present invention can provide open access to a large market for even very small software developers. Further, the present invention also allows software developers to adopt a standard access protocol, which allows them to provide support for any computer system which is capable of utilizing a HTML cognizant browser. Finally, by providing easy-to-implement, standardized solutions to the issues of user interface, authentication/security, and web transaction support, the common user interface of the present invention overcomes the limitations existing in previous solutions.

32 Claims, 22 Drawing Sheets

900

| APP2 | | | | |
|---|---|---|---|---|
| User ID | User Name | Password | Database Server | Database |
| User a | Joe Brown | Secret | CorpServer | CorpInfo |
| User b | | | | |
| User c | | | | |
| ⋮ | | | | |
| User x | | | | |

FIG. 9

```
<html>
<title>Cars Around the World<title/>
<FORM ACTION="/cgi-prot/exmp5cgi.exe" METHOD="POST">
<H3>Rental Reservation</H3>
<HR>
Enter the following information and then press submit:
<HR>
<p>Member number:    <INPUT TYPE="text" NAME="membno" SIZE=4>
<p>Name:    Last:    <INPUT TYPE="text" NAME="lname" SIZE=15>
                First:    <INPUT TYPE="text" NAME="fname" SIZE=15>
                MI:       <INPUT TYPE="text" NAME="mi" SIZE=1>
<HR>
<P>Origin City: <INPUT TYPE="text" NAME="origcity" SIZE=15>
        State:   <INPUT TYPE="text" NAME="origstate" SIZE=2>
<P>Start Date (MM/DD.YY): <INPUT TYPE="text" NAME="startdate" SIZE=8>
        Number of days <INPUT TYPE="text" NAME="days" SIZE=3>
<P>Select Car Preference:
        <INPUT TYPE="radio" NAME="cartype" VALUE=1> Compact
        <INPUT TYPE="radio" NAME="cartype" CHECKED VALUE=2> Mid Size
        <INPUT TYPE="radio" NAME="cartype" VALUE=3> Full Size
        <INPUT TYPE="radio" NAME="cartype" VALUE=4> Luxury
<HR>
<P><INPUT TYPE="submit" VALUE="Submit">
<P><INPUT TYPE="hidden" NAME="wf-cgi-submit" VALUE="2">
<P><INPUT TYPE="hidden" NAME="wf-api-proc-template" VALUE="www_Reservation Request">
<INPUT TYPE="hidden" NAME="wf-fmig-key" VALUE="webfmcust">
<INPUT TYPE="hidden" NAME="wf-cgi-html" VALUE="/exm/smp/exmp5srk.htm">
</form>
</html>
```

FIG. 11

```
membno=1234&lname=Doe&fname=John&mi=E&origcity=Nevade&origstate=IA&startdate=09%2F23%
2F96&days=4&cartype=2&wf-cgi-submit=2&wf-api-proc-template=www_Reservation_Request&wf-fmig-
key=webfmcust&wf-cgi-html=%2Fexm%2Fsmp%2Fexmp5srk.htm
```

FIG. 12

```
<html>
<title>Cars Around the World<title/>
<FORM ACTION="/cgi-prot/exmp5cgi.exe" METHOD="POST">
<H3><CENTER>Customer's Reservation Number</CENTER></H3>
<HR>
<p> <! - - "wf-act-outmsg" - ->
<HR>
<p><INPUT TYPE="submit" VALUE="OK">
<p><INPUT TYPE="hidden" NAME="wf-cgi-submit" VALUE="13">
</form>
</html>
```

FIG. 13

```
<html>
<title>Cars Around the World<title/>
<body>
<FORM ACTION="/cgi-prot/exmp5cgi.exe" METHOD="POST">
<H3><CENTER>Customer's Reservation Number</CENTER></H3>
<HR>
<p> Your reservation number is 4411. </p>
<HR>
<p><INPUT TYPE="submit" VALUE="OK">
<p><INPUT TYPE="hidden" NAME="wf-cgi-submit" VALUE="13">
<INPUT TYPE="hidden" NAME="wf-fmig-handle" VALUE="007777775F52657365727661 74696F">
<INPUT TYPE="hidden" NAME="wf-fmig-key" VALUE="webfmcust">
</form>
</html>
```

FIG. 14

```
wf-cgi-submit=13&wf-fmig-handle=007777775F52657365727661 74696F8wf-fmig-key=webfmcust
```

FIG. 15

```
<html>
<FORM ACTION="/cgi-prot/exmp5cgi.exe" METHOD="POST">
<HEAD>
<title>IBM Internet Connection for FlowMark home page</title>
</HEAD>
<BODY>
<h3>
IBM Internet Connection for FlowMark home page
</h3>
<hr>
<h4>
Enter key, select next screen, then press the submit button.
</h4>
<strong>
Key:
</strong>
<INPUT TYPE="text" NAME="wf-fmig-key" SIZE=64>
<br>
<INPUT TYPE="radio" NAME="wf-cgi-html" VALUE="/exm/html/exmp5ewi.htm" CHECKED>
<IMG SRC="/exm/icons/exmp5ewi.gif" ALIGN=MIDDLE HSPACE=5>Work with Work Items
<br>
<INPUT TYPE="radio" NAME="wf-cgi-html" VALUE="/exm/html/exmp5epi.htm">
<IMG SRC="/exm/icons/exmp5epi.gif" ALIGN=MIDDLE HSPACE=5>Work with Process Instances
<br>
<INPUT TYPE="radio" NAME="wf-cgi-html" VALUE="/exm/html/exmp5ept.htm">
<IMG SRC="/exm/icons/exmp5ept.gif" ALIGN=MIDDLE HSPACE=5>Work with Process Templates <!-- Start Submit Button & hidden variables --------------->

<hr>
<INPUT TYPE="submit" VALUE="Submit">
<INPUT TYPE="hidden" NAME="wf-cgi-submit" VALUE="0">

<!-- End Submit Button & hidden variables --------------->
<br>
<b>
[
<a href="/exm/docs/exmp5d20.htm">Help |
<a href=http://www.ibm.com/">IBM home page</a>> |
<a href=http://www.software.ibm.com/ad/flowmark/exmn0mst.htm">FlowMark home page</a>
]

</FORM>
</BODY>
```

FIG. 16

```
wf-fmig-key=webfmagent&wf-cgi-html=%2Fexm%2Fhtml%2Fexmp5ewi-htm&wf-cgisubmit=0
```

FIG. 17

```html
<html>
<FORM ACTION="/cgi-prot/exmp5cgi.exe" METHOD="POST">
<HEAD>
<title>FlowMark - Work Items,/titile>
</HEAD>
<BODY>
<img src="/exm/icons/exmp5eww.gif" alt=Work with Work Items>
<h4>Select a work item:</h4>
<TABLE BORDER=1>
<tr>
        <th COLSPAN=2>Description
        <th>Status
        <th>Activity name
        <th>Process
        <th>Program
        <th>Received<br>date & time
        <th>Priority
        <th>Category
<! - - "wf-cgi-rbegin" - - >
<tr>
        <td ALIGN=CENTER VALIGN=MIDDLE><INPUT TYPE="radio"
              NAME="wf-api-item" VALUE="wf-api-item-id">
        <td> NOWRAP><! - - "wf-api-item-descrip" - - >
        <td><! - - "wf-api-item-state" - - >
        <td><! - - "wf-api-item-name" - - >
        <td><! - - "wf-api-item-procinst" - - >
        <td><! - - "wf-api-item-impl" - - >
        <td ALIGN=CENTER><! - - "wf-api-item-starttime" - - >
        <td ALIGN=CENTER><! - - "wf-api-item-priority" - - >
        <td><! - - "wf-api-item-category" - - >
<! - - "wf-cgi-rend" - - >
</TABLE>

<hr>
<h4>Next, select which action you want to perform and
<br>
press the button below.
</h4>

<TABLE BORDER=0>
<tr>
<td>
<INPUT TYPE="radio" NAME="wf-cgi-submit" VALUE="3" CHECKED>
Start work item
<tr>
<td>
```

FIG. 18a

```
<INPUT TYPE="radio" NAME="wf-cgi-submit" VALUE="0">
Refresh list
</TABLE>
<!-- Start Submit Button & hidden variables --------------->
<hr>
<INPUT TYPE="submit" VALUE="Perform Action">
<INPUT TYPE="hidden" NAME="wf-cgi-html" VALUE="/exm/html/exmp5ewi.htm">
<!-- End Submit Button & hidden variables --------------->
<hr>
<aref="/exn/html/exmp5ehp.htm">
<img src="/exm/icons/exmp5efm.gif" ALIGN=MIDDLE HSPACE=5>
Return to home page
</a>
<aref="/exn/html/exmp5d20.htm">
<img src="/exm/icons/exmp5eoh.gif" ALIGN=MIDDLE HSPACE=5>
Help
</a>
<hr>
<TABLE BORDER=1>
<tr>
<td>FlowMark User
<td>FlowMark Database
<td>FlowMark Server
<td>Date & Time
<tr>
<td><!-- "wf-api-fmuser" -->
<td><!-- "wf-api-fmdb" -->
<td><!-- "wf-api-fmserver" -->
<td><!-- "wf-api-datetime" -->
</table>
</FORM>
</BODY>
</HTML>
```

FIG. 18b

```html
<html>
<FONT SIZE=3>
<FORM ACTION="/cgi-prot/exmp5cgi.exe" METHOD="POST">
<HEAD>
<title>FlowMark - Work Items</title>
</HEAD>
<BODY>
<img src="/exm/icons/exmp5eww.gif" alt=Work with Work Items>
<h4>Select a work item:</h4>
<TABLE BORDER=1>
<tr>
        <th COLSPAN=2>Description
        <th>Status
        <th>Activity name
        <th>Process
        <th>Program
        <th>Received<br>date & time
        <th>Priority
        <th>Category
<!- - "wf-cgi-rbegin" - ->
<tr>
        <td ALIGN=CENTER VALIGN=MIDDLE><INPUT TYPE="radio"
NAME="wf-api-item"
VALUE="7777775F5363686564756C655F5265736572766174696F6E007777775F52657365727661
74696F6E5F5265657175657374745F383500454D4147454E54007765626167656E7400776562666D616
7656E74">
        <td> NOWRAP>Schedule car
        <td>Ready
        <td>www_Schedule_Reservation
        <td>www_Reservation Request_85
        <td>Schedule_Reservation
        <td ALIGN=CENTER>09-03-1996 02:55:11PM
        <td ALIGN=CENTER>4004128
        <td>
<tr>
        <td>ALIGN=CENTER VALIGN=MIDDLE><INPUT TYPE="radio"
NAME="wf-api-item"
VALUE="7777775F5363686564756C655F5265736572766174696F6E007777775F52657365727661
74696F6E5F5265657175657374745F383500454D4147454E54007765626167656E7400776562666D616
7656E74">
        <td> NOWRAP>Schedule car
        <td>Ready
        <td>www_Schedule_Reservation
        <td>www_Reservation Request_84
        <td>Schedule_Reservation
        <td ALIGN=CENTER>09-03-1996 01:48:48PM
        <td ALIGN=CENTER>4004128
        <td>
<tr>
        <td>ALIGN=CENTER VALIGN=MIDDLE><INPUT TYPE="radio"
```

FIG. 19a

```
NAME="wf-api-item"
VALUE="7777775F5363686564756C655F5265736572766174696F6E007777775F5265736572766
174696F6E5F526571756573745F383500454D4147454E54007765626167656E7400776562666D6
167656E74">
          <td> NOWRAP>Schedule car.
          <td>Ready
          <td>www_Schedule_Reservation
          <td>www_Reservation Request_86
          <td>Schedule_Reservation
          <td ALIGN=CENTER>09-03-1996 03:01:15PM
          <td ALIGN=CENTER>4004128
          <td>
<! - - "wf-cgi-rend" - - >
</TABLE>
<hr>
<h4>Next, select which action you want to perform and
<br>
press the button below.
</h4>
<TABLE BORDER=0>
<tr>
<td>
<INPUT TYPE="radio" NAME="wf-cgi-submit" VALUE="3" CHECKED>
Start work item
<tr>
<td>
<INPUT TYPE="radio" NAME="wf-cgi-submit" VALUE="0">
Refresh list
</TABLE>
<! - - Start Submit Button & hidden variables - - - - - - - - - - - - - - - >
<hr>
<INPUT TYPE="submit" VALUE="Perform Action">
<INPUT TYPE="hidden" NAME="wf-cgi-html" VALUE="/exm/html/exmp5ewi.htm">
<! - - End Submit Button & hidden variables - - - - - - - - - - - - - - - >
<hr>
<ahref="/exn/html/exmp5ehp.htm">
<img src="/exm/icons/exmp5efm.gif" ALIGN=MIDDLE HSPACE=5>
Return to home page
</a>
<ahref="/exn/html/exmp5d20.htm">
<img src="/exm/icons/exmp5eoh.gif" ALIGN=MIDDLE HSPACE=5>
Help
</a>
<hr>
```

FIG. 19b

```
<TABLE BORDER=1>
<tr>
<td>FlowMark User
<td>FlowMark Database
<td>FlowMark Server
<td>Date & Time
<tr>
<td>FMAGENT
<td>WWWDB
<td>WWWSRV
<td>08:27:33 09/05/96
</table>
<INPUT TYPE="hidden" NAME="wf-fmig-key" VAULE="webfmagent">
</FORM>
</BODY>
</HTML>
```

FIG. 19c wf-api-item="7777775F5363686564756C655F5265736572766174696F6E007777775F52657365
72766174696F6E5F5265657175657374745F383500454D4147454E54007765626167656E7400776562
666D6167656E74"&wf-cgi--submit=3&wf-cgi-html=%2Fexm%2Fhtml%2Fexmp5ewi.htm&wf-fmig-
key=webfmagent

FIG. 20

```
<HTML>
<FORM ACTION="/cgi-prot/exmp5cgi.exe" METHOD="POST">
<HEAD>
<TITLE>Customer Information</TITLE>
<B>Customer Reservation Information</B>
<table border=1>
<tr><td>Name</td><td>Member Number</td><td>Resv Number</td>
<tr><td ><!- - "wf-act-name" - - ></td>
<td align=right>"wf-act-membno"</td>
<td align=right>"wf-act-resvno"</td>
</table>
<p><!- - "wf-act-outmsg" - - >
<HR>
<B>Move An Available Ca</B>
<P><INPUT TYPE="radio" NAME=cars CHECKED> <!- - "wf-act-car1" - - >
<P><INPUT TYPE="radio" NAME=cars > <!- - "wf-act-car2" - - >
<P><INPUT TYPE="radio" NAME=cars > <!- - "wf-act-car3" - - >
<P><INPUT TYPE="radio" NAME=cars > <!- - "wf-act-car4" - - >
<HR>
<INPUT TYPE="submit" NAME="move" VALUE="Move Car">
<INPUT TYPE="submit" NAME="cancel" VALUE="Cancel">
<INPUT TYPE="hidden" NAME="wf-cgi-submit" VALUE="13">
</FORM>
</HTML>
```

FIG. 21

```
<HTML>
<FORM ACTION="/cgi-prot/exmp5cgi.exe" METHOD="POST">
<HEAD>
<TITLE>Customer Information</TITLE>
<B>Customer Reservation Information</B>
<table border=1>
<tr><td>Name</td><td>Member Number</td><td>Resv Number</td>
<tr><td >John E. Doe</td>
<td align=right>1234</td>
<td align=right>4412</td>
</table>
<p>Reservation Date: <B>09/24/96</B>  Days Requested:
<B>4</B><P>Car Type Requested: <B>Luxery</B><P>Origin: <B>Nevada, IA</b>
<HR>
<B>Move An Available Ca</B>
<P><INPUT TYPE="radio" NAME=cars CHECKED> XYD123    Pontiac Grand Am
<P><INPUT TYPE="radio" NAME=cars >Chevy Camaro Z28
<P><INPUT TYPE="radio" NAME=cars >Chevrolet Lumina
<P><INPUT TYPE="radio" NAME=cars >Oldmobile Cutlass Supreme
<HR>
<INPUT TYPE="submit" NAME="move"  VALUE="Move Car">
<INPUT TYPE="submit" NAME="cancel"  VALUE="Cancel">
<INPUT TYPE="hidden" NAME="wf-cgi-submit"  VALUE="13">
<INPUT TYPE="hidden" NAME="wf-fmig-handle"
VALUE="7777775F4361725F556E617661696C61626C65007777775F52657365727661746F6E5F
526571756573745F3837">
<INPUT TYPE="hidden" NAME="wf-fmig-key"  VALUE="webfmagent">
</FORM>
</HTML>
```

FIG. 22

COMPUTER APPARATUS AND METHOD FOR PROVIDING A COMMON USER INTERFACE FOR SOFTWARE APPLICATIONS ACCESSED VIA THE WORLD-WIDE WEB

RELATED APPLICATION

This application is related to the following U.S. patent applications: "Computer Apparatus and Method for Communicating Between Software Applications and Computers on the World-Wide Web Using Universal Variable Handling", Ser. No. 08/780,014, filed Dec. 23, 1996, "Computer Apparatus and Method for Providing Security Checking for Software Applications Accessed via the World-Wide Web", Ser. No. 08/772,737, filed Dec. 23, 1996; "Computer Apparatus and Method Including a Disconnect Mechanism for Communicating Between Software Applications and Computers on the World-Wide Web", Ser. No. 08/772,738, filed Dec. 23, 1996; and "Computer Apparatus and Method for Communicating Between Software Applications and Computers on the World-Wide Web", Ser. No. 08/780,013, filed Dec. 23, 1996.

BACKGROUND OF THE INVENTION

1. Technical Field

This invention generally relates to interactions on the world-wide web, and more specifically relates to an apparatus and method for providing access to software applications via the world-wide web.

2. Background Art

The development of the EDVAC computer system of 1948 is often cited as the beginning of the computer era. Since that time, computer systems have evolved into extremely sophisticated devices, and computer systems may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful than those that existed just a few years ago.

Computer systems typically include operating system software that control the basic function of the computer, and one or more software applications that run under the control of the operating system to perform desired tasks. For example, a typical IBM Personal Computer may run the OS/2 operating system, and under the control of the OS/2 operating system, a user may execute an application program, such as a word processor. As the capabilities of computer systems have increased, the software applications designed for high performance computer systems have become extremely powerful.

Other changes in technology have also profoundly affected how we use computers. For example, the widespread proliferation of computers prompted the development of computer networks that allow computers to communicate with each other. With the introduction of the personal computer (PC), computing became accessible to large numbers of people. Networks for personal computers were developed to allow individual users to communicate with each other. In this manner, a large number of people within a company could communicate simultaneously over a network with a software application running on a single computer system.

One significant computer network that has recently become very popular is the Internet. The Internet grew out of the modern proliferation of computers and networks, and has evolved into a sophisticated worldwide network of computer systems linked together by web pages that collectively make up the "world-wide web", or WWW. A user at an individual PC (i.e., workstation) that wishes to access the WWW typically does so using a software application known as a web browser. A web browser makes a connection via the WWW to other computers known as web servers, and receives information from the web servers that is displayed on the user's workstation. Information displayed to the user is typically organized into pages that are constructed using a specialized language called Hypertext Markup Language (HTML). Web browsers that use HTML are now available for almost every computer system on the market, making the WWW accessible to practically anyone who has access to a computer and a modem. Although the WWW is becoming increasingly popular, the rapid growth and expansion of computer users accessing the WWW has brought along with it concomitant problems. Some of these problems are identified below.

With the growing popularity of the Internet and the WWW, businesses have recognized that the Internet provides a new way to boost both sales and efficiency. If a user with a web browser can interact directly with a company's software application, a given transaction will be simplified. For example, let's evaluate how a person typically reserves a rental car. The person calls the rental car agency, and then gives his or her information (i.e., name, address, credit card number, etc.) to the rental car agent over the phone. The agent must enter the information into the car rental software application to initialize the process to reserve a car. A more efficient car reservation system for web users would allow the user to interact directly with the car rental software application. This would eliminate many of the tasks that the car rental agent now performs. However, devising a car rental software application that is capable of interacting directly with web users would require creating custom interface software. Likewise, a custom user interface must be created for each different software application that is to be accessed via the WWW. The preferred interface would be a graphical user interface (GUI). The process of generating a custom GUI for a software application is time consuming and expensive, and typically results in a proprietary user interface that cannot be used for communicating with other software applications. This means that a company has a significant disincentive that would prevent them from providing access to their software applications via the WWW.

In addition, many computer users have adopted very different forms of hardware/software computer platforms. For example, while the IBM-compatible personal computer is the most common type of computer system available today, other vendors have developed very different product lines with significant numbers of computer systems presently installed and in use. These disparate hardware systems typically utilize completely different operating systems. The existence of these various different hardware and software systems will typically require a completely new programming and development effort to "port" or translate the custom GUI for a given software application to each different hardware platform. Many companies will only support the most popular hardware/software combinations, thereby limiting market share and reducing the number of users who have access to the software application.

The problem of multiple unrelated user interfaces highlights yet another problem that may also prevent the rapid adoption of software applications via the WWW. Assuming a company has absorbed the cost of developing a custom GUI for a given software application, the GUI developed by one company will most likely differ significantly from the GUI developed by another company for their respective software applications. Typically, each software vendor will create a custom GUI for each specific software application so that whenever a user accesses the software application via the WWW, the user can access the specific features of the software application. However, since every product has different features and every vendor has differing standards for application/user interaction, the result is often a vastly different user interface for each and every software application that the user encounters. The user is often forced to "re-learn" basic skills for interacting with each and every software application they wish to access.

The current situation for accessing software over the WWW is somewhat analogous to the early days of the personal computer. In the early 1980s, the IBM personal computer (PC) was introduced and was quickly adopted as the industry standard hardware platform. However, even though the hardware platform was relatively standard, each independent software vendor created significantly different user interfaces for their respective application programs. This, in turn, proved to be an impediment to the rapid adoption of new application programs by the users of personal computers. Because users were unable to efficiently use new software applications without extensive training, many new software applications were not adopted.

Today, however, new standards have been developed and adopted for personal computer software applications which dramatically reduce the amount of re-learning that must take place for new software applications. State-of-the-art GUI operating systems such as IBM's OS2 have standardized many common user actions and provided independent software developers and vendors with the "hooks" or programming tools necessary to access most standard user interface components and features, thereby dramatically reducing the learning curve for end-users. Unfortunately, this standardization effort has not yet penetrated the WWW In fact, the ready availability of the WWW as a delivery system for software applications has exacerbated the rapid proliferation of the disparate software now available over the WWW. In addition, some of the most powerful software applications available have non-intuitive, non-graphical user interfaces. The process of re-learning a new interface for each new application tends to be tedious, time-consuming and non-productive. Therefore, even though many software applications may be accessible over the WWW today, learning how to access these various programs can be time-consuming, frustrating, and intimidating for the end-user.

DISCLOSURE OF INVENTION

Recognizing both the importance of providing access to software applications over the WWW, and the current limitations of existing solutions, the present invention provides the capability to easily access many different application programs over the WWW via a standardized GUI. By providing standard procedures, routines, tools, and software "hooks" for accessing software applications over the WWW, software developers can concentrate on the functionality of the application program and easily use HTML to provide a GUI interface for the application program.

As mentioned above, HTML is a well-known language which can be used by almost any computer system on the market today. In addition, since HTML is a fairly well controlled and standardized language, new software application features can be added as they are developed and supported by HTML. In addition, since HTML is a widely adopted, non-proprietary technology, the present invention can provide open access to a large market for even very small software developers. Further, the present invention also allows software developers to adopt a standard access protocol, which allows them to provide support for any computer system which is capable of utilizing a HTML cognizant browser. Finally, by providing easy-to-implement, standardized solutions to the issues of user interface, authentication/security, and web transaction support, the common user interface of the present invention overcomes the limitations existing in previous solutions.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIG. 9 is a tabular representation of a portion of a user library;

FIG. 11 is an example of HTML code used to generate a car rental reservation form in accordance with a preferred embodiment of the present invention;

FIG. 12 is an example of a data stream generated by a user request from a web browser in accordance with a preferred embodiment of the present invention;

FIG. 13 is an example of HTML code used to generate a reservation confirmation template in accordance with a preferred embodiment of the present invention;

FIG. 14 is an example of the HTML code of FIG. 10 after processing by a CGI in accordance with a preferred embodiment of the present invention;

FIG. 15 is an example of web browser formatted data in accordance with a preferred embodiment of the present invention;

FIG. 16 is an example of HTML code used to generate a web page for a car rental reservation agent in accordance with a preferred embodiment of the present invention;

FIG. 17 is an example of web server generated data in accordance with a preferred embodiment of the present invention;

FIGS. 18a and 18b provide an example of HTML code used to generate a car rental agent work list in accordance with a preferred embodiment of the present invention;

FIGS. 19a, 19b, and 19c provide an example of HTML code of FIG. 15 after processing by a CGI in accordance with a preferred embodiment of the present invention;

FIG. 20 is an example of the data stream received from a web browser by a CGI in accordance with a preferred embodiment of the present invention;

FIG. 21 is an example of HTML code used to generate an automobile availability page in accordance with a preferred embodiment of the present invention;

FIG. 22 is an example of the HTML code of FIGS. 18a and 18b after processing by a CGI in accordance with a preferred embodiment of the present invention.

BEST MODE FOR CARRYING OUT THE INVENTION

The present invention relates to transactions via the WWW. For those individuals who are not Internet or WWW experts, the Overview section below presents many basic concepts that will help to understand the invention.

OVERVIEW

Web Transactions

Figure 2:
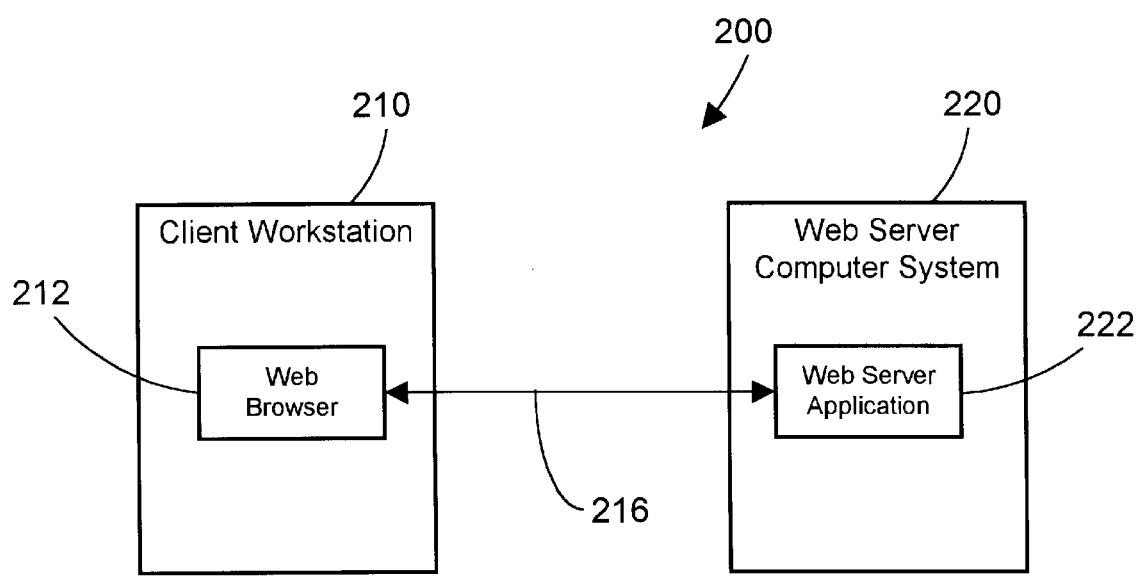
FIG. 2 is a block diagram of a transaction between a client workstation and a web server.

Referring now to FIG. 2, a typical transaction between a standard web browser 212 running on a client workstation 210 and a web server application 222 running on a web server computer system 220 occurs over a connection 216. Client workstation 210 may be coupled to other computer systems via a local area network (LAN) or via any other type of computer network or other interconnection. Likewise, web server computer system 220 may be coupled to other computer systems as well. Client workstation 210 may be any computer that is capable of providing access to the WWW by using web browser 212. This would include handheld, portable or laptop computers, standard desktop computer systems, Personal Digital Assistants (PDAs), non-programmable terminals connected to a mainframe, etc.

Web browser 212 is a software program running on client workstation 210 that allows a user at client workstation 210 to communicate with other computers over connection 216. Web browser 212 would include any web browser which is capable of transmitting and receiving data over the WWW. This includes commercial software applications such as IBM's WebExplorer, Netscape Navigator, Microsoft Internet Explorer, Apple Computer's CyberDog, and any other software application which now exists or which may be developed in the future for accessing or processing information over the WWW. A preferred embodiment for connection 216 is any suitable connection to the Internet, including a hardwired connection, telephone access via a modem or high-speed T1 line, infrared or other wireless communications, computer network communications (whether over a wire or wireless), or any other suitable connection between computers, whether currently known or developed in the future.

It should be noted that client workstation 210 and web server computer system 220 may be the same physical and/or logical computer system. Web browser 212 typically displays pages of HTML data to a user at client workstation 210. Other types of data (besides HTML) may also be transmitted to web browser 212, including text data, graphical data (e.g., Graphic Image Format (GIF) files), audio data or sound files (e.g., WAV files), Java applets (executable code) and a specialized data form known as Multipurpose Internet Mail Extensions (MIME) data (which may include combinations of the foregoing and other data types).

Web server application 222 is a software program running on web server computer system 220 that allows a user at client workstation 210 to access information controlled by web server 220. One preferred embodiment of web server application 222 in accordance with the present invention is a commercial web server application such as IBM's Internet Connection Server. Other applications are also compatible with the present invention. Web server computer system 220 typically outputs pages of HTML data to WEB browser 212 in response to requests by web browser 212 that reflect action taken by the user at client workstation 210. In addition, as explained above, web server computer system 220 may output other types of data to web browser 212 as well. Output data may include static HTML pages (meaning that the content of the page does not vary), or may include data that must be dynamically determined and inserted into the output data. Web server application 222 may dynamically build output data (e.g., an HTML page) from parts that it retrieves from memory within web server computer system 220 or from other computer systems, or may simply pass through an HTML page or other information that has been developed at an earlier time or by another computer.

Web browser 212 typically interacts with web server application 222 by transmitting input (e.g., a Uniform Resource Locator (URL) or an HTML page) over connection 216 to web server computer system 220. This input is typically transmitted using Hypertext Transfer Protocol (HTTP) 1.0. Web server computer system 220 running web server application 222 receives the input from web browser 212, and in response, outputs data (e.g., an HTML page) to browser 212. The process described above illustrates a basic transaction over the Internet, recognizing that many details and variations that are within the scope of the present invention are not disclosed herein for the purpose of providing a simple context for understanding the concepts of the present invention.

Web server computer system 220 may also have numerous other software components, including Common Gateway Interface (CGI) modules. CGI modules may be used as an interface between web server application 222 and other software applications. For example, a CGI module could provide a link between web server 222 and a calendar software application, allowing web server 222, for example, to insert dynamic calendar information into the web pages it outputs to web browsers 212. Thus, CGIs allow web servers to distribute dynamic data from other software applications. Unfortunately, programming a CGI is a time-consuming task, given the numerous specifications that a CGI should satisfy. Furthermore, a separate CGI is generally needed for each different software application to be interfaced with the web server 222. Additionally, different CGI's may be required to perform different functions, such as granting different users different levels of access to the same software application or data. In general, as the number of CGIs increases, the performance of web server computer system 220 decreases.

Web Pages

Figure 3:
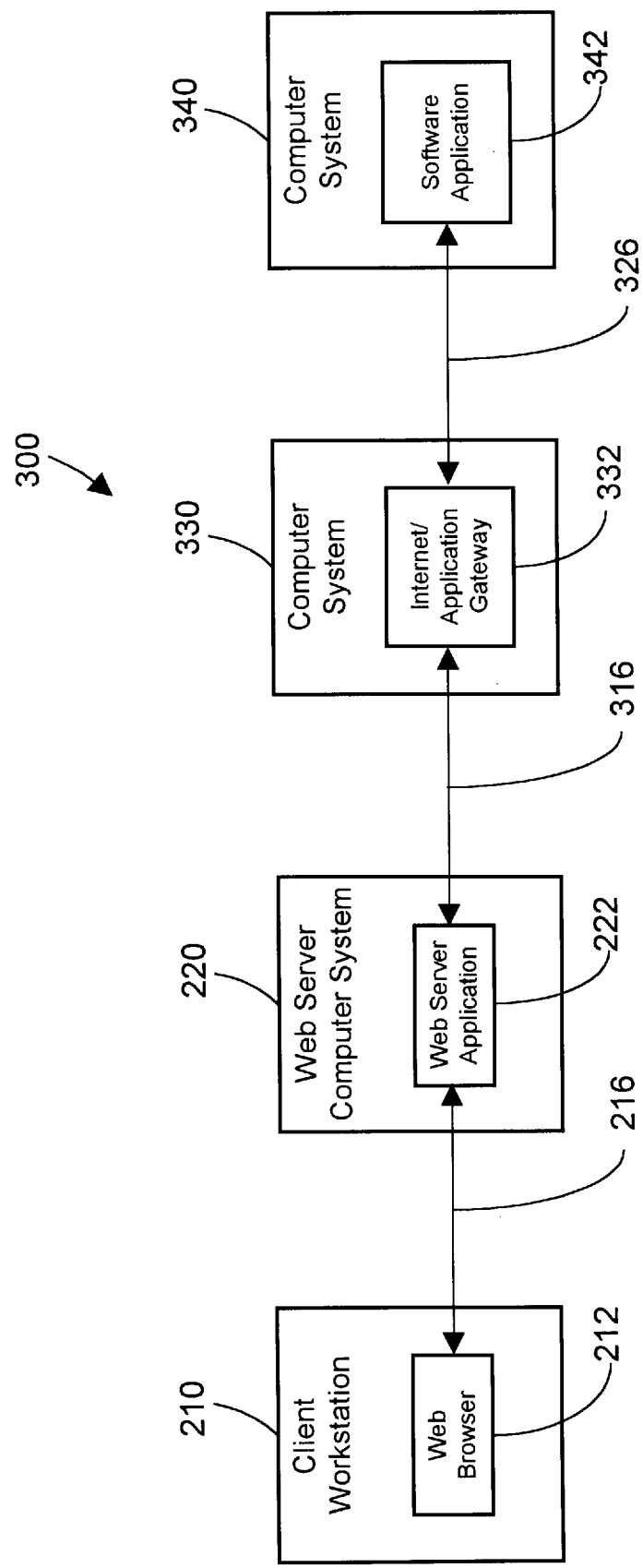
FIG. 3 is a block diagram of a system according to a preferred embodiment of the present invention that allows access to a software application over the World-Wide Web from a standard web browser.

Referring now to FIG. 3, a web page is primarily visual data that is intended to be displayed on the monitor of client workstation 210. Web pages are generally written in Hypertext Markup Language (HTML). When web server application 222 running on web server computer system 220 receives a web page request from web browser 212, it will build a web page in HTML or retrieve a file containing a pre-built web page and send it across connection 216 to the requesting web browser 212. Web browser 212 understands HTML and interprets it and outputs the web page to the monitor of client workstation 210. This resulting web page, displayed on the user's screen, may contain text, graphics, and links (which are URL addresses of other web pages.) These other web pages (i.e., those represented by links) may be on the same or on different web servers. The user can retrieve these other web pages by clicking on these links using a mouse or other pointing device. This entire system of web pages with links to other web pages on other servers across the world collectively comprise the "World-Wide Web" (WWW).

Some web pages are designed to elicit input from web browser 212. For example, a web page may request the user's name in an HTML form and require the user to select a particular function using an HTML radio button. These requests are sent to web browser 212 from web server 222. The web user responds by entering the requested information and resubmitting the page back to web server 222, which parses the inputted data received from the user. Unfortunately, the user may not respond immediately to the request for input. In fact, it is foreseeable that a user may wait several minutes, hours, or even days before submitting the requested input or, alternatively, may disconnect without ever completing the transaction. During this time, web server 222 typically waits for the input with various processes still running, waiting for the anticipated response. This can lead to problems where running processes are left active as they wait for input, inefficiently monopolizing the resources of web server 222.

APIs

Application Programming Interfaces (APIs) are used by program developers to provide access to certain features of a given software application. Each application program will have APIs that allow third parties to access certain features, to interface the application program with other programs, and to provide access for end-users. While each application program will typically have unique APIs, the functionality and use of different APIs provided by different vendors can often be fairly similar. Some examples of APIs that are commonly found in many different software applications are presented below for software application 342 running on computer system 300 as shown in FIG. 3.

The SEND API is issued to send data (in the form of HTML pages or other types) to web browser 212. Software application 342 calls the SEND API which, in turn, transmits a send request and sends the data through Internet/application gateway 332 and web server 222 to the appropriate web browser 212.

The RECEIVE API is issued to receive data from web browser 212. This can include CGI data and environment data as needed. Software application 342 calls the RECEIVE API to direct Internet/application gateway 332 to wait for input. Once the input has arrived, Internet/application gateway 332 will pass the data to software application 342 for processing.

Web Security

As the WWW has experienced explosive growth in the last few years an ever increasing concern is web security. In particular, where web browsers and web servers are being used to provide web-based access to other computer resources (i.e., software applications, data files, HTML web pages, etc.) those resources must be kept secure. This involves assuring that access to those resources is granted only to approved web users.

In some cases, a system must be provided where different users are granted access to different resources accessible through the web server. For example, one web server may provide web access to two software applications, and each software application may provide access to multiple databases. Some users may need access to one software application, but not the other, while other users may need access to both software applications, but only to specified databases controlled by those software applications. If a user is authorized to access one of the two software applications, and security checking is only performed at the web server level, granting access to the user will grant access to both software applications, even though the user is not authorized to access the second software application. Even if security checking is performed before granting access to each software application, granting access would allow the user to access any of the databases that are accessible by the software application. Thus, more sophisticated security checking techniques are needed to assure that unapproved users cannot gain access to sensitive resources while access for approved users is maintained.

Typical web security uses a password and userID combination to authenticate a particular web user to access a particular web server or specific resources through that web server. When a web user attempts to access such a protected resource, he must supply a userID and password. This is typically accomplished by having the web server prompt the web user to enter a userID and password, which is then stored by the web browser and transmitted back to the web server application for verification/authentication.

This authentication process is typically repeated for each specific resource that is accessible through the web server application. Thus, a web user that accesses several secure resources is prompted and required to enter his or her password and userIDs for each resource. For example, a user might have to enter his or her password and userID to gain access to a web server, a second password and userID to gain access to a software application through the web server and a third password and third userID to gain access to a particular software application database. This may require the user to memorize a large number of passwords and userIDs in addition to the inconvenience of having to submit them multiple times. Even if the password and userID are the same at each level, it becomes tedious to repetitively enter the same information again and again.

In traditional web server authentication systems, the web browser resends the password and userID each time a submission is sent to the web server. Thus, the password and userID are repeatedly subjected to the risk of "snooping" (i.e., the unauthorized and unwanted interception of the transmissions between web server and web browser). Some systems try to limit this problem by regularly the users to change their passwords and userID's, but this can be a significant problem where multiple passwords and multiple userID's are required to access multiple software applications.

The problems associated with the prior art solutions have lead some system operators to remove additional security protection measures and rely only on the web server authentication with a userID and password. Again, this solution should be adopted only where a high risk of unauthorized access to the web-accessible resources is acceptable.

DETAILED DESCRIPTION

According to the present invention, an apparatus and method for providing a graphical, common user interface to multiple software applications provided by multiple software vendors from a web browser over the WWW is disclosed. The system includes one or more computers executing a web browser, a web server application, an application gateway, and at least one software application. The system and method allows a user of a web browser to access multiple software applications using a common user interface. The user inputs data via the web browser, which data is communicated to the web server application. The web server application authenticates the web browser and passes appropriate input data to an application gateway, including data to uniquely identify and track the user's request. The application gateway then facilitates a response to the request by formatting the appropriate commands to the software application. The software application responds by outputting the appropriate data to the application gateway. The output data includes an identifier that can be used to match the output data with the specific web browser that requested the output data. This system also provides simultaneous access to numerous software applications for numerous web browsers. In addition, the present invention allows any standard WWW HTML browser to act as a truly platform independent client for the server and provides a consistent and effective end-user interface for all server subsystems to interact with.

There are four main components which, when coordinated into a comprehensive GUI interface, comprise a preferred embodiment of the present invention: custom application programming interfaces (APIs) that provide WWW transaction support technology capable of receiving and transmitting Multipurpose Internet Mail Extension (MIME) data formats to a single client application; a security mechanism that can provide support for server-side security and simultaneously shield the end-user from the intricacies of the security system; a mechanism that defines common WWW user interface components such as HTML templates/forms that can address a majority of typical application processing input and output requirements; and a disconnect processing mechanism which automates the handling of complex issues such as disconnects, processing timeouts, client and/or server abnormal exits and other typical processing issues. Each of the four subsystems will be described in greater detail in the sections below.

Figure 1:
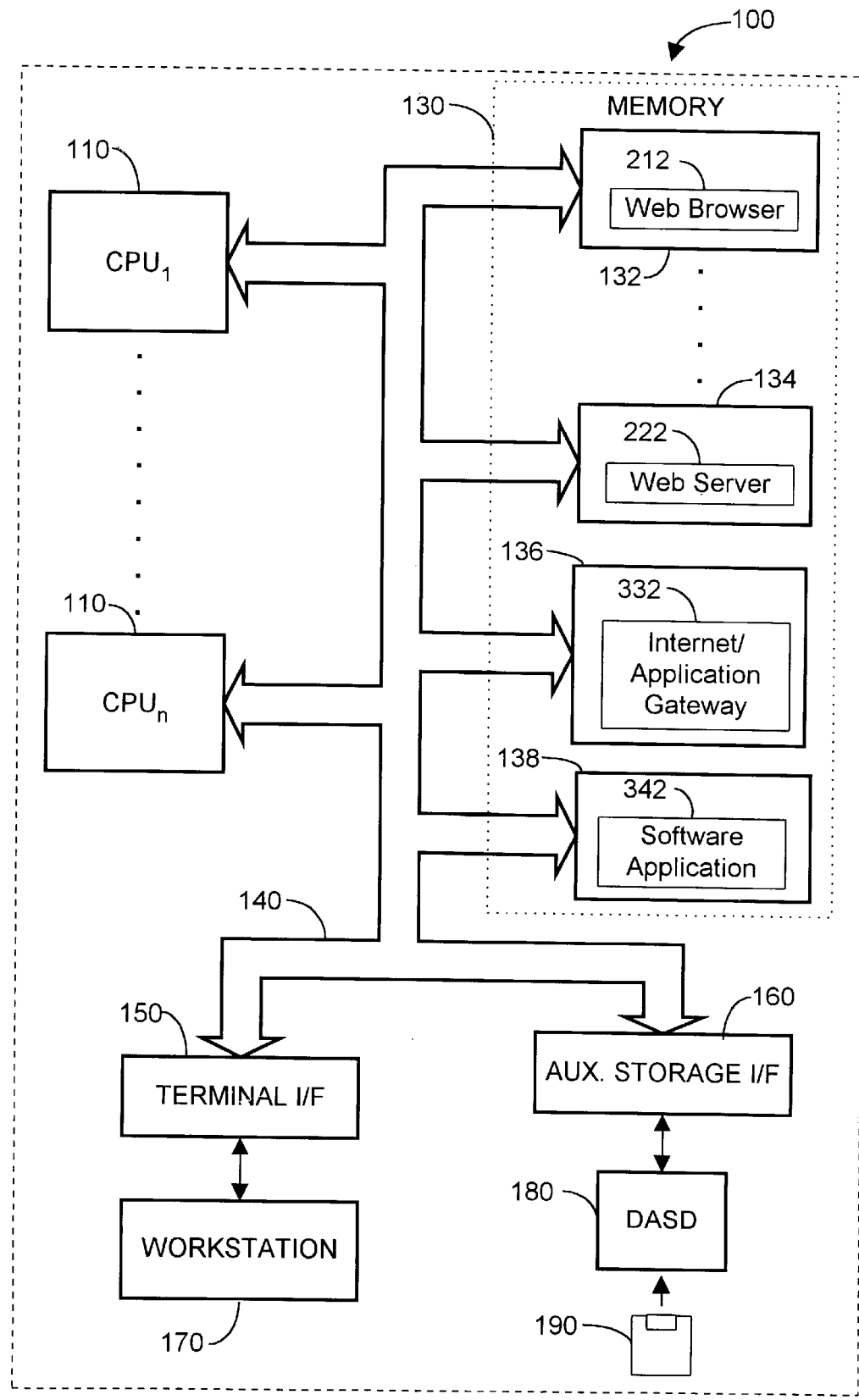
FIG. 1 is a block diagram of a preferred embodiment of the present invention.

Referring now to FIG. 1, a computer system in accordance with a preferred embodiment of the present invention includes: a plurality of Central Processing Units (CPUs) 110; a terminal interface 150; an auxiliary storage interface 160; a workstation 170; a Direct Access Storage Device (DASD) 180; a floppy disk 190; a bus 140; and a memory 130 which includes multiple locations for containing various software programs. In this example, memory 130 includes a web browser 212 running in location 132, a web server application 222 running in location 134, an Internet/application gateway program 332 running in location 136, and a software application 342 running in location 138.

CPUs 110 perform computation and control functions of system 100. All CPUs associated with system 100 may each individually comprise a single integrated circuit, such as a microprocessor, or may comprise any suitable number of integrated circuit devices and/or circuit boards working in cooperation to accomplish the functions of a central processing unit. All CPUs are capable of suitably executing the programs contained within memory 130 and acting in response to those programs or other activities that may occur in system 100.

Memory 130 is any type of memory known to those skilled in the art. This would include Dynamic Random Access Memory (DRAM), Static RAM (SRAM), flash memory, cache memory, etc. While not explicitly shown in FIG. 1, memory 130 may be a single type of memory component or may be composed of many different types of memory components. For example, web browser 212 running in location 132 may be part of system 100's cache memory. In addition, memory 130 and CPUs 110 may be distributed across several different computers that collectively comprise system 100. For example, web browser 212 may reside on one computer with $CPU_1$, web server application 222 may reside on another computer system with a separate $CPU_2$, Internet/application gateway 332 may reside on a third computer system with a different $CPU_{n-1}$ and software application 342 may reside on a fourth computer with a different $CPU_n$. Computer system 100 of FIG. 1 simply illustrates many of the salient features of the invention, without limitation regarding the physical location of CPUs 110 or memory locations within memory 130.

Bus 140 serves to transmit programs, data, status and other forms of information or signals between the various components of system 100. A preferred embodiment for bus 140 is any suitable physical or logical means of connecting computer systems and components known to those skilled in the art. This includes, but is not limited to, direct hard-wired connections, Internet connections, Intranet connections, fiber optics, infrared (IR) and other forms of wireless connections. It is anticipated that many alternative methods and material for connecting computer systems and components will be readily adapted for use with the present invention. This would include those methods and materials not presently known but developed in the future.

Terminal interface 150 allows human users to communicate with system 100, normally through programmable workstation 170. Although system 100 as depicted in FIG. 1 contains only a single workstation 170, it should be understood that the actual number of workstations attached to system 100 will be a function of system design and user preference. Workstation 170 may also be a dumb terminal or other non-programmable computer input/output device which allows human interaction with computer system 100.

Auxiliary storage interface 160 represents any method of interfacing a storage apparatus to a computer system known to those skilled in the art. Auxiliary storage interface 160 allows auxiliary storage devices such as DASD 180 to be attached to and communicate with the other components of system 100. While only one auxiliary storage interface 160 is shown, the present invention anticipates multiple interfaces and multiple auxiliary storage devices such as DASD 180. As shown in FIG. 1, DASD 180 may be a floppy disk drive which is capable of reading and writing programs or data on floppy disk 190. DASD 180 may also be any other type of DASD known to those skilled in the art. This would include CD-ROM drives, hard disk drives, optical drives, etc. Floppy disk 190 represents a typical 3.5 inch magnetic media disk known to those skilled in the art.

Figure 5:
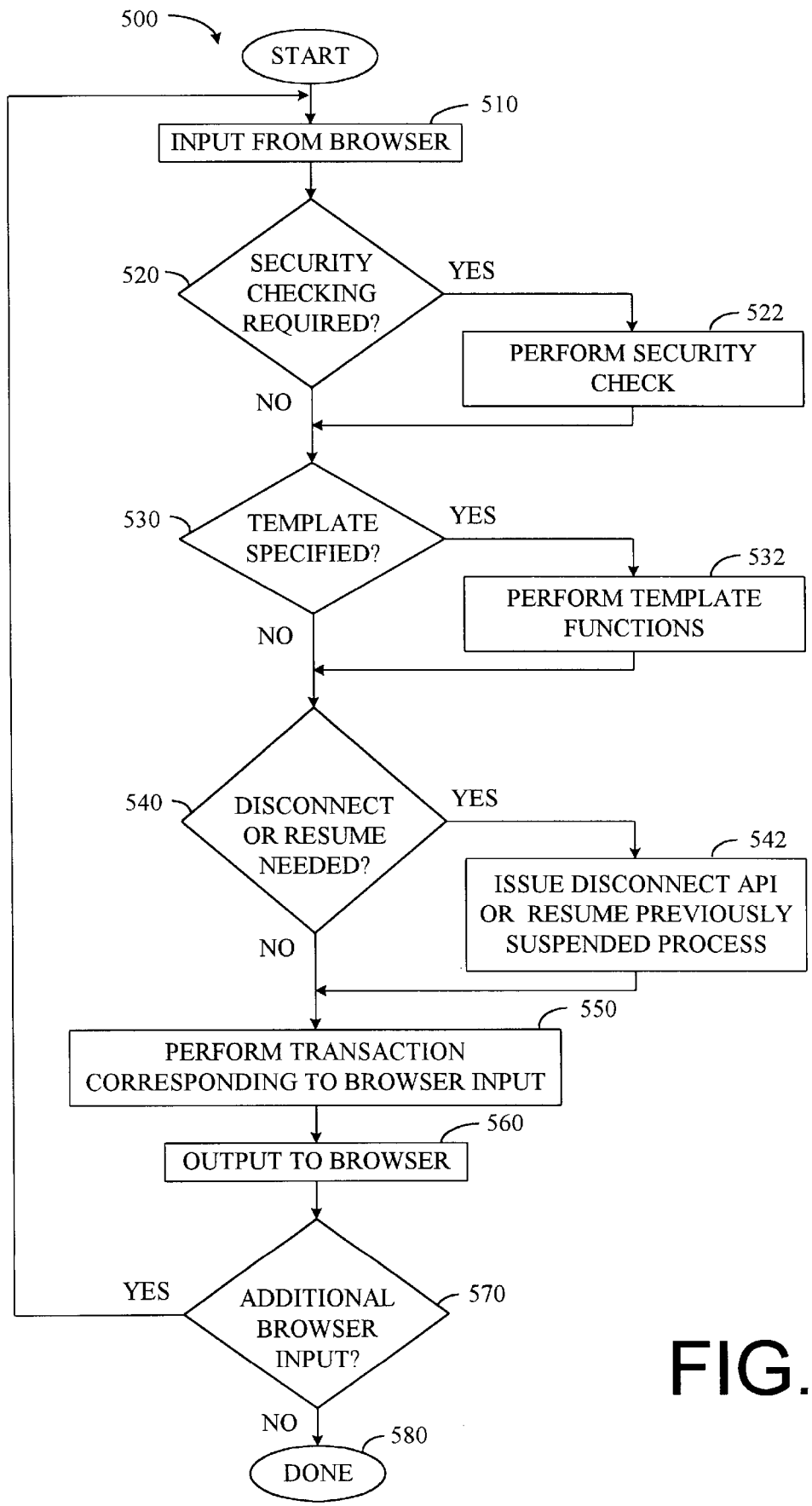
FIG. 5 is a flow diagram of a method in accordance with a preferred embodiment of the present invention that illustrates some of the features of the common user interface.

Referring now to FIG. 5, a method 500 for accessing software applications over the WWW via a GUI according to a preferred embodiment of the present invention is shown. To initiate access to a software application over the WWW, a user will take some action which generates input from the web browser to the web server (step 510). The web server will determine if security checking is required to perform the necessary actions associated with the users request (step 520). If the user has requested access to a protected resource, the appropriate security checking mechanism is invoked and the required authentication will be accomplished (step 522). The user's request may involve gathering and transferring input data from the user at various stages. If so, then an HTML template with HTML substitution variables may be evaluated as part of the overall process or transaction (step 530). Any necessary HTML template and variable processing will be accomplished as required (step 532). At some point, the user may not respond to the web browser's request and a DISCONNECT API may be issued to temporarily suspend processing the user's request. Alternatively, some prior user interaction may have already occurred and a DISCONNECT API may have previously been invoked. In either case, it may be necessary to suspend a current process or to resume a previously suspended process (step 540). If necessary, the appropriate process will be restarted or suspended as required (step 542). Finally, the actual user request can be evaluated and the appropriate response can be generated by the software application (step 550). After the requested function has been performed, the results generated by the user's request are displayed by the web browser (step 560). Additional web browser input can be processed in a similar fashion by repeating the steps listed above, if required.

While the steps shown in FIG. 5 have been described and illustrated as being independent and sequential, these various steps are not necessarily sequential and are preferably integrated within the same web transaction, as illustrated in the rental car example shown below. The steps may be performed as needed and in any combination or order desired. Some software applications may require completion of all of the steps shown while other processes and requests may require only one or two of the steps for completion. The actual sequence of steps and the detailed requirements for each step will remain largely a design choice for a specific software application.

SECURITY MECHANISM-FLOWMARK EXAMPLE

Figure 6:
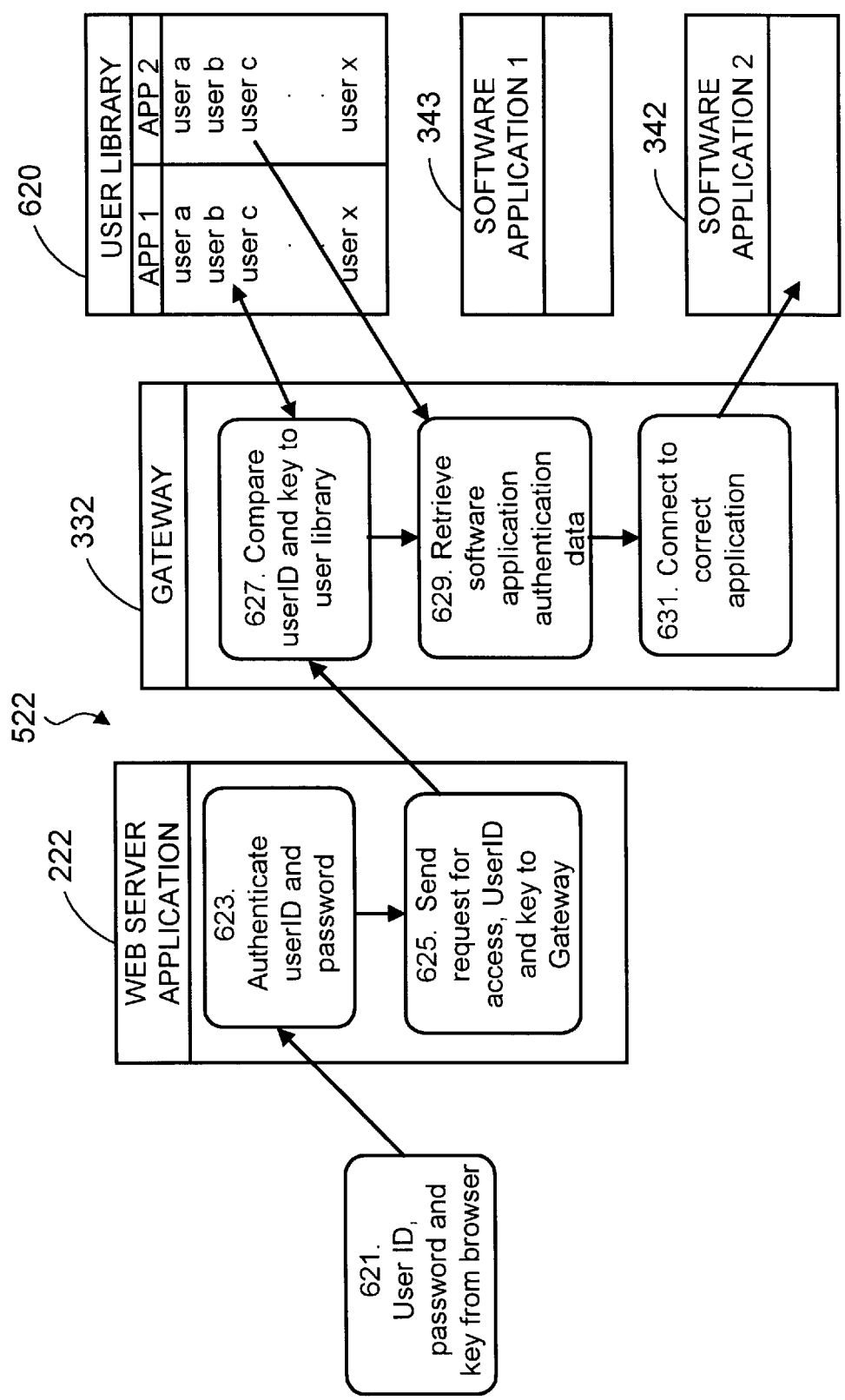
FIG. 6 is a process flow diagram of the security checking feature of FIG. 5.

Referring now to FIGS. 2 and 6, step 522 of FIG. 5 is performed by a security mechanism. While this step is described with reference to accessing software applications, it is equally applicable when used to access other computer resources, such as databases and networks. As mentioned above, a user at client workstation 210 performs an action that causes web browser 212 to request access to a software application via the WWW by inputting data to web server application 222. The input data may include an HTML form with input blanks used for entering appropriate authentication data. After the authentication data is entered, the user submits the data to web server application 222 (step 621). According to a preferred embodiment, the authentication data includes a userID, a password and a key. The userID and password can comprise typical web-based userID and passwords. The key can comprise any set of data that serves as an identification mechanism. For the purpose of illustration, one possible key is "flowmarkuser01975."

The web server uses the userID and password to authenticate the user according to standard web authentication procedures (step 623). When the user is properly authenticated by web server application 222, the userID and key are passed to the gateway 332 along with the request for access to a particular software application (step 625). Gateway 332 compares the userID and key to userIDs and keys stored in a user library 620 (step 627). User library 620 preferably stores the user information for a plurality of software applications that are to be accessed through gateway 332. User library 620 can be structured in a wide variety of ways. For example, each software application could have the same key for all approved users. Thus, when the gateway 332 receives the key it compares users with the submitted userID in the library 620 for the application specified by the key. Alternatively, each key can be unique and the gateway will search the entire library for a matching key and userID.

Regardless of the specific implementation, user library 620 contains the authentication data needed to access the corresponding software applications for each authorized user. Thus, gateway 332 can retrieve the required software application authentication data (step 629). With the software authentication data, gateway 332 can create a communication connection to software application 342 (step 631). In particular, in a preferred embodiment, user library 620 can provide the same authentication data that would normally be required to grant non-web based access to each software application. Because user library 620 stores the normal authentication data for each software application, gateway 332 can use normal security procedures provided by the native interface to software application 342. A secure web connection to software application 342 can thus be provided without altering the native software application security system or requiring that a system administrator implement and maintain a special security system for providing web access to software application 342. In addition, the user need not know or understand the native software application security system, since the user interacts with the GUI, which, in turn, interacts with the native security system.

In this example, the key and userID correspond to a userID and key stored in user library 620 for software application 342. The userID and key are used to locate authentication information for the software application(s) that the user is authorized to access. If the userID and key are not found in user library 620, the user is not authorized to access the requested resources through gateway 332. The software application authentication data stored in user library 620 may include workgroup user names, workgroup passwords, application database identifiers, or any other information that is needed to facilitate communication with software application 342 according to the native security system utilized by software application 342. Because this authentication data is never sent across the WWW, it is not subjected to the risk of being snooped by unauthorized users.

The security mechanism of the present invention provides secure access and authentication processes for a software application from a web browser over the WWW. The mechanism provides secure access to multiple software applications or other computer resources without requiring the user to memorize multiple passwords and userIDs by using a library of users containing authentication data for the multiple software applications. The mechanism includes one or more computers executing a web browser, a web server application, an application gateway, and a software application after performing appropriate security checks. The mechanism allows a user of the web browser to access the software application. The user inputs data via the web browser, which is communicated to the web server application. Web server application then authenticates the web browser, and passes appropriate input data to an application gateway, including data to uniquely identify the web browser. The application gateway then uses authentication data received from the browser to determine whether the user of the browser is authorized to access the software application.

In a preferred embodiment, the browser authentication information is used to correlate the user with appropriate authentication information for the software application. The application gateway then uses this new authentication information to gain access (i.e., log on) to the software application.

Figure 4:
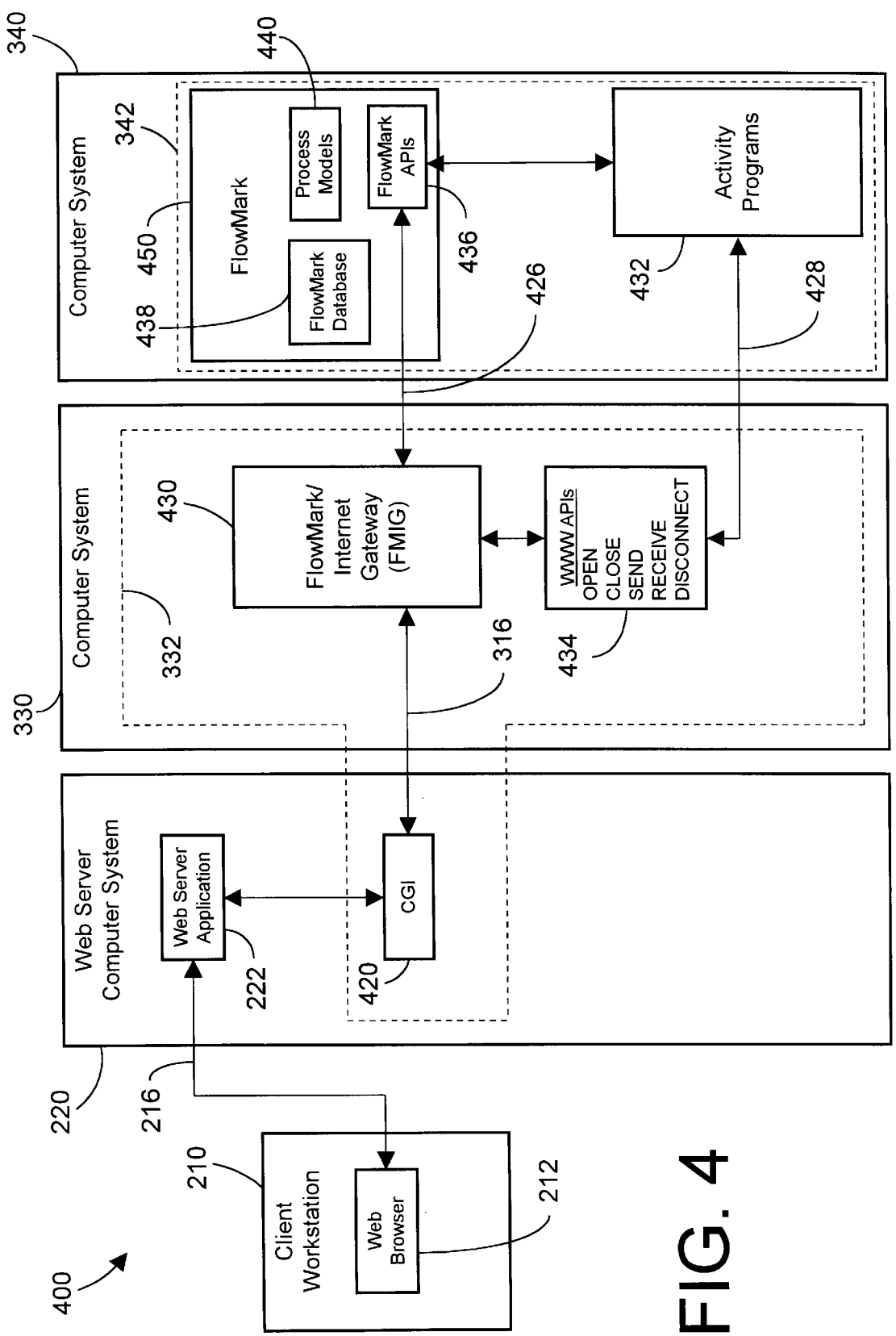
FIG. 4 is a more detailed block diagram of the system of FIG. 3, further adapted to access FlowMark workflow application software over the World-Wide Web.

Referring now to FIGS. 4, 6 and 9, the security mechanism of the present invention as used to access Flowmark application 342 over the WWW is illustrated. As explained above, a user who needs to access FlowMark application 342 over the WWW will take some action that will generate a data stream to web server application 222. Web server application 222 will examine the user's data stream to determine what action should be taken to fulfill the user's request. If the user-requested information requires access to FlowMark application 344 there will be a command embedded in the data stream generated from web browser 212 that directs web server application 222 to pass control to CGI 420. In this example, access to CGI 420 is protected to keep unauthorized users from accessing FlowMark application 342 via the WWW. In order to gain access to CGI 420, the user must be authenticated by web server application 222. When web server application 222 sees the CGI command in the data stream generated by web browser 212, it requests a password and user identification (userID) from the user via web browser application 222.

Additionally, according to the preferred embodiment the web server application 222 requires a key from web browser 212. There are two primary ways to provide and deliver a key to the web server from the web browser. First, the key can be embedded in the original HTML page that is submitted back to the web server. This is the preferred method where control of access is not a primary concern. For example, embedding the key in the HTML form would be useful if the submitted HTML form is one used by visitors or "guests" to access limited functions of the software application. By embedding the key into the form that is passed to the CGI, the gateway is told automatically to grant the user access to the software application corresponding to the "guest" key. Additionally, for this situation the userID and password could also be embedded. With the userID, password and key embedded for all in the HTML form, the required authentication is provided without the user even being aware that his or her access has been authenticated.

The key is preferably embedded by assigning a variable value that is recognized by the gateway as a key in the HTML form. Web server 222 receives the form, passes control to CGI 420, which parses out the variable with its assigned value, then passes this information to FMIG 430. FMIG 430 compares the key value and userID with those stored in user library 620. FMIG 430 then retrieves the authentication data for the selected software application based on the key.

In a second method for supplying the key, web server 222 sends a request for the user to input a key to web browser 212. This method requires the user to enter the value, and thus provides additional security to access the software application corresponding to the key. Typically a REALM request is issued from the web server 222 to the web browser 212. The REALM request is a well-known software security feature which requires the user to input a userID and password in order to gain access to CGI 420.

When the web browser 212 receives the request, the user must type in the userID, password and key and submit them to web server 222 to proceed. Thus, the web browser 212 stores and sends the userID, password and key to web server application 222. The web server application 222 then authenticates the user as one with access to web server 222 using the userID and password. Web server 222 stores the userID and password received from the user, and sends the userID and key to the FMIG 430 through CGI 420. FMIG 430 compares the userID and key with those in user library 620. If a match is found, the FMIG 430 retrieves the required authentication data from the user library corresponding to the userID and key.

In a preferred embodiment, the authentication data includes all the information normally necessary to access FlowMark through its native non-web based interface. The authentication data stored in the user library can thus include FlowMark workgroup user names, FlowMark workgroup passwords, FlowMark application database identifiers, or any other information that is needed to facilitate communication with the FlowMark application that corresponds to the submitted key. Because this authentication data is never sent across the WWW, it is not subject to the risk of being snooped.

A portion 900 of user library 620, with a format suitable for use with FlowMark, is shown in FIG. 9. For each user (e.g., user a, user b) there is a corresponding user name, password, database server identifier and database identifier that provides the needed authentication information for each listed user to access the FlowMark application 342. Because user library 620 stores the normal authentication data for FlowMark, FMIG 430 can use normal security procedures when connecting to FlowMark. Thus, a secure web connection to FlowMark can be provided without having to alter the normal FlowMark security system. A system administrator does not need to implement and maintain special security system for web access to FlowMark. The security mechanism of the present invention allows FMIG 430 to authenticate the user and establish a connection to FlowMark.

INTERFACE COMPONENTS MECHANISM

Figure 7:
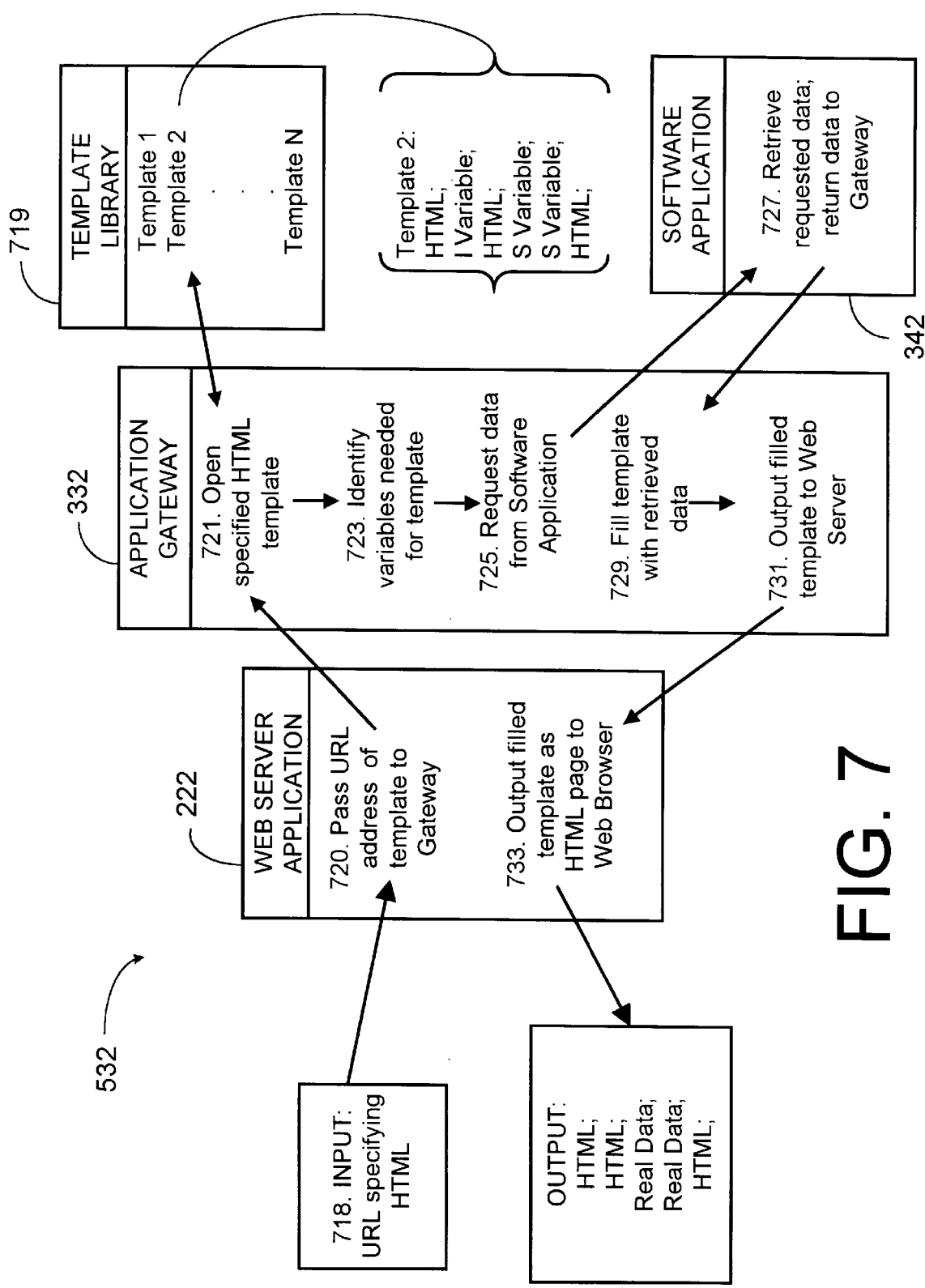
FIG. 7 is a process flow diagram of the template/HTML variable feature of FIG. 5.

Referring now to FIGS. 2 and 7, step 532 of FIG. 5 is performed by an interface components mechanism that uses HTML variables and templates. As mentioned above, a user performs an action that causes the web browser to request access to a software application via the WWW by inputting data to web server application 222 (step 718). In this example, the input data comprises an URL or other address data that specifies the location of an HTML template. Web server application 222 passes the URL address of the specified template to Gateway 332 (step 720). Gateway 332 then retrieves and opens the specified HTML template located in a template library 719 (step 721). Template library 719 is preferably co-located with Gateway 332 but can be located anywhere as long as it is accessible by Gateway 332. Template library 719 preferably contains a wide variety of HTML templates that a systems developer can use as examples in developing an interface for software application 342.

In the illustrated example, the URL address specifies template 2 of the template library 719. Gateway 332 then identifies the variables stored in template 2 (step 723). Gateway 332 generates the appropriate commands that the software application 342 can understand and communicates the commands to software application 342. Gateway 332 then requests the data needed for each substitution variable from software application 342 (step 725). Software application 342 then processes the request for input data (step 727). In processing the request for input data, software application 342 may initiate additional software processes to generate the data, call other programs that have the data, or retrieve data for local and/or networked data storage. Software application 342 then returns the requested data to gateway 332 (step 727). Gateway 332 then substitutes the variables in the HTML template with the data retrieved from software application 342 (step 729). Gateway 332 then outputs the HTML template to web server 222 with the real data substituted for the substitution variables (step 731). Web server application 222 then provides the web server output data to web browser 212 (step 733).

To facilitate the use of Internet/application gateway 332 as a gateway between software application 342 and web server 332, a library of HTML templates are provided. The library of HTML templates provide a flexible and easily customizable way of providing access to multiple software applications, including software application 342 through web browser 212 without requiring multiple CGI modules. Thus, systems operators can create custom web interfaces to a wide variety of applications, without having to satisfy CGI programming requirements, by using appropriate templates.

In a preferred embodiment, each of the supplied HTML templates include one or more variables. When a submission is received from a web client that specifies a template, Internet/application gateway 332 opens the template. Internet/application gateway 332 than parses the template, locating the variables inside the template. The values for these variables are then requested from their associated software application. Software application 342 may simply retrieve data corresponding to the variables, or may initiate software processes to generate the appropriate data. By inserting variables associated with more than one software application, a single web page can access data from these multiple software applications. The data is parsed into the HTML template by Internet/application gateway 332 and delivered to web server 222, which delivers the output to web browser 212. Thus, by using templates with properly defined variables, system operators can provide web based access to software application data without the difficultly of creating a completely new custom interface for every software application.

In a preferred embodiment, the library of HTML templates include a wide variety of HTML pages that can be used by systems developers to provide web browser interaction with a software application. To achieve this end, the HTML templates preferably include various templates that employ different levels of HTML sophistication. For example, some templates could use advanced HTML tags such as those specified only in HTML version 3.2. The use of these advanced tags allows for sophisticated formatting but requires an advanced web browser. Thus, HTML templates containing these advanced tags can be used by systems developers that expect users to employ advanced web browsers to access the software application. Conversely, HTML templates could also be provided that adhere to earlier HTML versions, such as HTML 2.0, and as such would be accessible by a wide variety of less sophisticated web browsers. By providing a wide range of templates, a preferred embodiment gives system operators a wide flexibility in providing web interfaces to software applications.

The HTML templates of a preferred embodiment include input variables that are used to pass data between web browser 212 and software application 342. In addition, substitution variables are used to provide customized output from software application 342. The variables are written into the HTML templates in such a way that they can be identified by Internet/application gateway 332. One such method involves writing the variables into HTML comments and using a web server that has the ability to parse variables located in the comments.

Input variables are inserted into HTML pages to provide input from web browser 212 to Internet/application gateway 332 and software application 342. For example, an input variable can be included in an HTML page that specifies the next HTML page to be sent to web browser 212. In that case, when the HTML page is submitted back to web server 222, the Internet/application gateway 332 parses out the variable and directs web server 222 to deliver the specified HTML page back to web browser 212.

Additionally, the Internet/application gateway 332 can be configured to pass a particular variable from one HTML screen to the next HTML screen. For example, a variable representing a particular communication instance can be inserted into subsequent HTML screens to allow Internet/application gateway 332 to track a particular user's interaction with software application 342.

Substitution variables are variables included in the HTML templates which are used to communicate dynamic data back to the web browser. These variables are parsed from the HTML templates by Internet/application gateway 332. The substitution variables are then passed to software application 342. Software application 342 then locates the appropriate data represented by the substitution variables. This data can be generated by software application 342 according to a predefined process or can be simply retrieved from the appropriate data storage.

User-defined variables can be added to HTML templates by system operators to provide specialized inputs and outputs as needed for different types of software applications. These variables should be named in such a way that Internet/application gateway 332 can determine which software application to pass the variable information to or retrieve the variable information from. Additionally, by adding a plurality of variables to an HTML template, inputs to a plurality of different software applications may be made from the submission of one template from web browser 212. Likewise, data can be retrieved from a plurality of software applications 342 and inserted into a single web page which is output to web browser 212.

DISCONNECT MECHANISM

Figure 8:
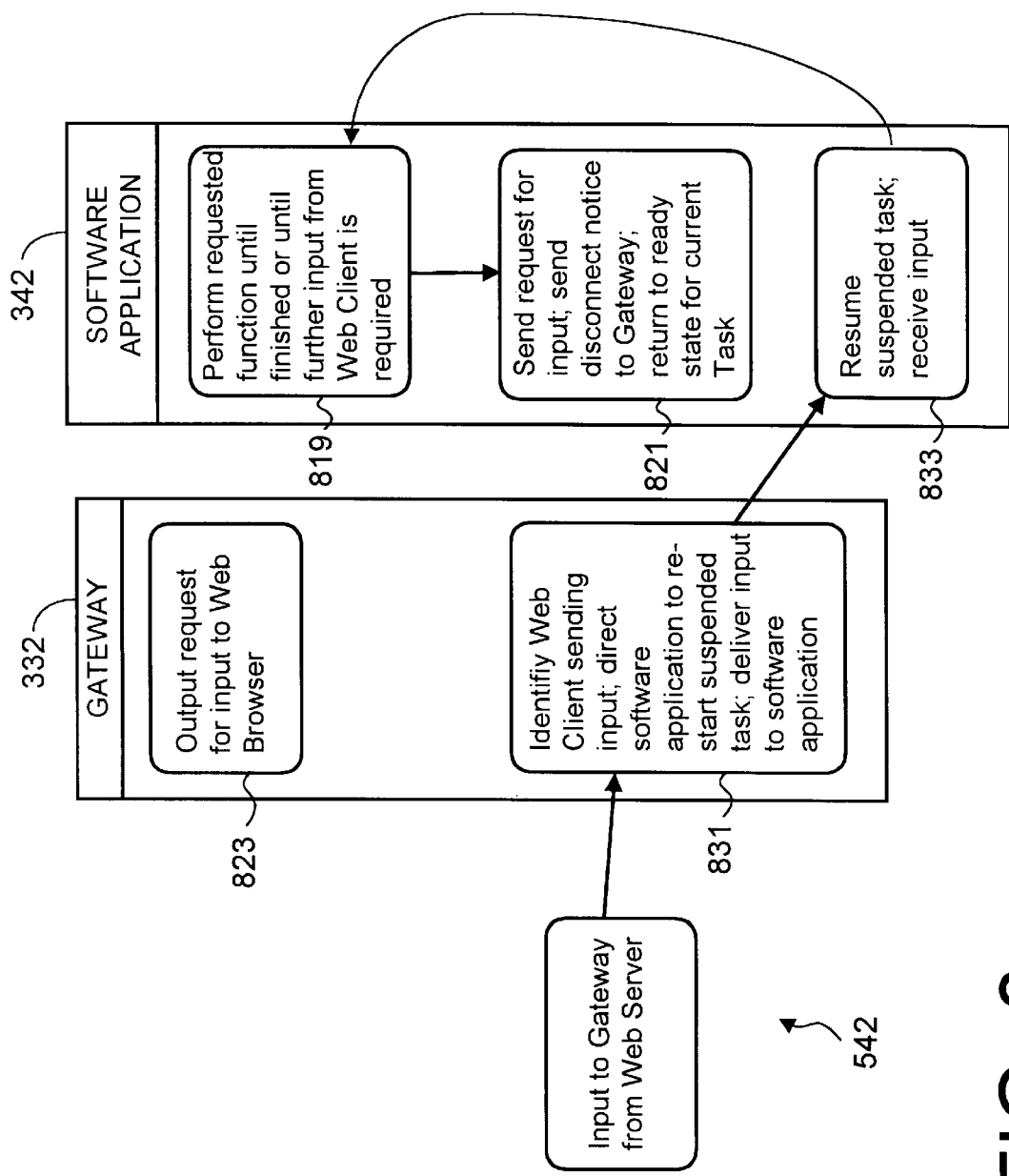
FIG. 8 is a process flow diagram of the resume/disconnect API features of FIG. 5.

Referring now to FIGS. 3 and 8, step 542 of FIG. 5 is performed by a disconnect mechanism. At this point in the process, communication has already been established between client workstation 210 and software application 342 through gateway 332. This generally involves authentication of the user, if necessary, using the web server authentication and security measures explained above. Additionally, an identifier has been created to identify this "conversation" or specific communication between the user and software application 342. This identifier is called a conversation identifier and is attached to all information transmitted between the user and software application 342 and is used to tag the information as belonging to this specific communication. This conversation identifier uniquely marks or tags all conversations between a specific web browser and software application 342. A conversation is generally commenced by invoking an OPEN application program interface (API), and is generally terminated by invoking a CLOSE API. Gateway 332 uses the conversation identifier to keep track of individual requests because Gateway 332 may be servicing multiple users and multiple requests from each of those users. Gateway 332 thus maintains the information necessary to control the flow of data between the various users and software application 342.

In general, once a user has accessed software application 342, software application 342 will continue to process the user's request to completion or until further input is needed from the web client (step 819). For example, processing could be halted if software application 342 needs input from the user to select an appropriate database to locate additional data needed for further processing. At this point, software application 342 sends a request for input to the user through gateway 332 (step 821). Software application 342 then calls a DISCONNECT API on Internet/application gateway 332 (step 821). The DISCONNECT API is a disconnect mechanism used to allow software application 342 to suspend a process while it waits for input. The DISCONNECT API causes gateway 332 to save the necessary data and state information corresponding to the suspended conversation, including the conversation identifier. The software application 342 then suspends the current software process and returns to a state that will allow the software process to be restarted later.

Gateway 332 then communicates the request for input to the user through the web server application (step 823). The user will typically fulfill the request by entering the appropriate data into an HTML field. When the web client user hits the submit button, the entered data is submitted back to software application 342 through the web server and gateway 332. This response may come quickly or after a relatively long period of time has passed. In any case, gateway 332 identifies the web client sending the input data, and recognizes that the data is for a process of software application 342 that has been suspended. This is preferably done by matching the conversation identifier included with the input to a database of conversations indexed by their conversation identifiers. Gateway 332 then directs the software application to restart the suspended process corresponding to the conversation identifier (step 831). Software application 342 can then re-start the suspended process where it left off and receive the input data (step 833). At this point, the process either returns to step 819 for additional processing as before or terminates, as required.

In a preferred embodiment, the step of calling the DISCONNECT API and suspending the software application 342 process is done each time an input is requested from the web browser 212. This limits the amount of computer resources that are required for the processes to wait for the input to return. The DISCONNECT API is also preferably used anytime computer systems 220, 330 or 340 need to temporarily shutdown for maintenance. This can be used to ensure reliability without undue disruption in running software processes.

Internet/application gateway 332 includes a plurality of APIs designed to facilitate the interaction between web browser 212 and software application 342. These APIs preferably include an OPEN API and a DISCONNECT API. In addition, the APIs can include SEND, RECEIVE and CLOSE API's.

The OPEN API starts a set of interactions between the software application 342 and the web browser 212. In particular, when the OPEN API is called it generates a conversation identifier that is used to tag the conversation between software application 342 and web browser 212. A conversation may include a number of different processes to accomplish a desired task. The conversation identifier is preferably included in all communications (i.e., communications between software application 342 and Internet/application gateway 332, between web browser 212 and web server 222) to identify what conversation each individual communication belongs to.

The DISCONNECT API allows software application 342 to suspend a running process until it is needed or able to restart the process. This is particularly useful where input is needed from the web client user to complete an already running process of software application 342. When software application 342 requires such an input, a request must be sent back through web server 222 to web browser 212. For a variety of reasons it may be hours or even days before the input is sent back through web server 222 and to software application 342, if the input is ever sent at all. The DISCONNECT API allows software application 342 to suspend the process until the input is received. In particular, the software application sends notice that it will suspend the process (identified by its conversation identifier) to Internet/application gateway 332 and calls the DISCONNECT API. The DISCONNECT API directs Internet/application gateway 332 to save the required information to restart the process that is being suspended. Thus, when the input is finally received, Internet/application gateway 332 will recognize that this input is for a suspended process (by using the associated conversation identifier) and will direct software application 342 to restart the suspended process and will deliver the input and required state information back to software application 342.

Thus, the DISCONNECT API allows long delays between software application 342 and web browser 212 communications that could otherwise result in unfinished software processes left waiting for action. The DISCONNECT API receives the conversation identifier and saves the required information such that Internet/application gateway 332 can restart the process when needed.

The CLOSE API is issued when all interactions between software application 342 and web browser 212 are complete for a particular conversation. Software application 342 calls the CLOSE API which tags the conversation as complete and purges unnecessary files and data relating to the closed conversation.

The SEND API is issued to send data (in the form of HTML pages or other types) to web browser 212. Software application 342 calls the SEND API which transmits a send request and sends the data through Internet/application gateway 332 and web server 222 to the appropriate web browser 212. The SEND API uses the conversation identifier to determine which web browser 212 needs the requested data.

The RECEIVE API is issued to receive data from web browser 212. This can include STDIN data and environment data as needed. Software application 342 calls the RECEIVE API to direct Internet/application gateway 332 to wait for input. Once the input has arrived, Internet/application gateway 332 uses the conversation identifier to match the input data to the appropriate conversation and passes the data to software application 342 for any required processing. Thus, Internet/application gateway 332 uses the OPEN, DISCONNECT, CLOSE, SEND and RECEIVE APIs to facilitate communication between software application 342 and web browser 212.

WWW TRANSACTION SUPPORT MECHANISM

Referring now to FIG. 4, for the purpose of illustrating WWW transaction support, a system 400 which allows access to a specific software application over the WWW from web browser 212 is shown. In this example, software application 342 is a work flow application known as Flow-Mark which is programmed to perform a specific function. While this specific example uses FlowMark to describe the invention, the present invention is not limited to FlowMark. Other software applications may be used in conjunction with the present invention and it is anticipated that additional application software packages will be so used.

FlowMark is a popular process engineering tool that allows a relatively complex project or task to be broken down into a series of smaller processes or tasks. The activity to be executed by FlowMark is described by using one or more process models 440 that describe the process flow and activity. This makes FlowMark very useful for activities and transactions that can be accomplished by computer systems over communication networks. FlowMark is used to build process models 440 which describe the real life task as a series of computerized sequences. Information is processed by the FlowMark workflow software and usually involves multiple related activities. The FlowMark workflow process language models the activity and automates transactions where appropriate. Individual tasks are generated into "work lists" (i.e., electronic "to do" lists). One example of using FlowMark to accomplish a specific task will be presented in detail below.

System 400 of FIG. 4 represents one suitable detailed implementation of system 300 shown in FIG. 3. The same computer systems are present (i.e., 210, 220, 330, and 340), with web browser 212 and web server application 222 residing on client workstation 210 and web server computer system 220, respectively. In addition, connection 326 of FIG. 3 encompasses connections 436 and 432 of FIG. 4. System 400 of FIG. 4 is presented herein to show one specific implementation of Internet/application gateway 332 when used to communicate with FlowMark workflow software application 342.

For this specific implementation, Internet/application gateway 332 includes a Common Gateway Interface (CGI) 420, a FlowMark/Internet Gateway (FMIG) 430 and WWW Application Program Interfaces (APIs) 434. The four standard WWW APIs are Open, Close, Send, and Receive. WWW APIs 434 provide a communication link between FMIG 430 and activity program 432. FlowMark application software 342 includes FlowMark 450, and one or more activity programs 432. FlowMark 450 includes a database 438, one or more process models 440, and FlowMark APIs 436. A specific software application 342 is implemented in system 400 by defining a process model 440 within FlowMark, and by defining activity programs 432 that perform specific tasks within process model 440. FlowMark Application Program Interfaces (APIs) 436 are standard APIs that are supplied with FlowMark 450 and provide a way for activity programs 432 and FMIG 430 to communicate with FlowMark 450. FlowMark database 438 is a general purpose database that may be used to store information relating to any process model. For example, if a process model 440 and activity programs 432 implement a rental car work flow process, FlowMark database 438 would be used to store information relating to the rental car process, such as which cars are available, etc.

The user who needs to access a FlowMark application 342 over the WWW will input a request to web browser 212 using client workstation 210. The user can enter a URL for a specific home page site or click on a button presented in an HTML-generated user interface using web browser 212. When the user "submits" the requested information, usually by clicking on a button presented on an HTML form, web server application 222 receives input data from web browser 212. This data stream may be presented to web server application 222 in many different formats, including RFC 1866 or RFC 1867 formats. These two specific formats are just examples of common data stream formats that common web browsers understand. The present invention is not limited to these formats but includes any data transmission format now known or developed in the future.

If the user-requested information requires access to Flow-Mark application 342, there will be a command embedded in the data stream that identifies the need to access CGI 420 which will, in turn, provide access to FlowMark application 342. For this specific example, the command is a call to CGI 420. The call to CGI 420 may be part of the URL or, alternatively, may be embedded in the data submitted by web browser 212. Access to CGI 420 is protected to keep unauthorized users from accessing FlowMark application 342 via the WWW. In order to gain access to CGI 420, the user must be authenticated by web server application 222. The authentication mechanism discussed above with reference to FIG. 6 is the preferred authentication mechanism. When web server application 222 sees the CGI command in the data stream generated by web browser 212, it requests a password and user identification (userID) from the user via web browser application 222. After the user has been authenticated, web browser application 222 passes control to CGI 420 to perform the needed operation(s).

CGIs are executable programs that are well known to those skilled in the art. CGIs function to provide a mechanism for transmitting information across the WWW. CGI 420 passes information from web server application 222 to FMIG 430 in the form of commands. The commands are one-way, i.e., from CGI 420 to FMIG 430, but data and status pass in both directions. Web server application 222 invokes CGI 420, and sends the appropriate commands and data regarding the request. Although the current preferred embodiment of the invention uses the "CGI Post" (stdin) format for data transmission from web browser 212 to CGI 420, any other data transmission formats that may be generated by web browser 212 are contemplated and are within the scope of this invention. In addition, it should be noted that the parsing and other operational functions of CGI 420 may be implemented in other ways. For example, many web server applications currently support "modules." Modules are software routines implemented by using Dynamic Linked Libraries (DLLs). Modules are capable of performing the same functions as CGI 420 in system 400 of FIG. 4 and may replace CGI 420 in some preferred embodiments of the present invention. The use of modules and DLLs is well known to those skilled in the art. Therefore, the use of CGI 420 is for purposes of illustration only and is not a limitation of the present invention.

After receiving the data from web browser 212, CGI 420 parses the data to locate relevant information about the requested processes, including the request for access to FlowMark 342. CGI 420 sends the user data and requests to FMIG 430 along with some control information. FMIG 430 provides a way for FlowMark application 342 to interact with a web user over the WWW. FMIG 430 directs the flow of information between CGI 420 and FlowMark application 342 and initiates FlowMark functions by using FlowMark APIs 436. For example, FMIG 430 may invoke a FlowMark API 436 to create a process instance necessary to process the request submitted by the user. Then, using a different FlowMark API 436, FMIG 430 can invoke or start this process instance. The process is governed by a process model 440, which tells FlowMark 450 which activity program 432 must be invoked to perform the desired task. Once FMIG 430 has started a FlowMark process, it waits until it receives information from FlowMark 450 via FlowMark APIs 436 or from activity programs 432 via WWW APIs 434 that the request has been processed. The command interface between FMIG 430 and FlowMark APIs 436 is one-way, i.e., FMIG 430 always invokes FlowMark APIs 436, but the data and status information flows in both directions. This is important because it allows the interface to FlowMark application 342 to remain unchanged even if the web interface is changed.

FMIG 430 will also assign a conversation identifier to the requests from each web client that require interaction with FlowMark. As explained above, the conversation identifier uniquely marks or tags all conversations between a specific web browser and FlowMark. A conversation is generally commenced by invoking an OPEN application program interface (API), and is generally terminated by invoking a CLOSE API. FMIG 430 uses the conversation identifier to keep track of individual requests because FMIG 430 may be servicing multiple users and multiple requests from each of those users. FMIG 430 thus maintains the information necessary to control the flow of information between the various users and the process instances being processed by FlowMark.

Activity programs 432 are software modules which can be used by FlowMark to accomplish the tasks requested by the user. Individual activity programs 432 are initiated by FlowMark and then the Activity Program 432 communicates with the web client via WWW APIs 434. Each workflow process model 440 initiates the activity programs 432 necessary to accomplish the designated task. Each activity program 432 is an instance of a program that runs to accomplish the desired task, returns the requested information, and then terminates. For example, activity programs 432 may require information from the user in order to process the user's request. Activity program 432 invokes appropriate WWW APIs 434 to obtain the necessary data. In this case, FMIG 430 has data waiting to submit to activity program 432, which is the same data that CGI 420 sent earlier in the process. Activity program 432 invokes WWW API 434 to send a request for the data to FMIG 430 and FMIG 430 returns this data to activity program 432 in response to the request from WWW API 434. Activity program 432 takes the appropriate steps to process the data and fill the request. Activity programs 432 communicate with the user through WWW APIs 434, FMIG 430, CGI 420, web server application 222, and web browser 212. Activity programs 432 will also receive a return code from WWW API 434 to verify that the user has received the requested data. After confirmation has been received, that specific instance of activity programs 432 is finished with that request and will terminate. Other instances of one or more activity programs 432 may still be active, processing other requests.

WWW APIs 434 serve to provide interaction between FMIG 430 and activity programs 432. WWW APIs 434 allow FlowMark activity programs 432 to send and receive data and status to and from web clients. It is important to note the FlowMark APIs 436 remain unchanged. This is important because FlowMark APIs are not modified to allow a web user to access FlowMark. In this sense, FlowMark is unaware that a web client is accessing it, and FlowMark operates in the same manner it would as if a dedicated application were performing the requested functions. Since the FlowMark APIs are not affected, the operation of FlowMark will remain stable regardless of the process or task the web client is requesting that FlowMark application 342 accomplish. Multiple users from multiple locations can access FlowMark via the WWW and be assured that the FlowMark interface will remain stable. In some cases, the system will present a transparent web client, which means that there will be no indication to the user that their request is being processed by FlowMark application 342.

It should be noted that Web Server Application 222 may be co-located with Web Browser 212. In addition, while not required, Computer System 330 and Computer System 340 are the same computer system in a preferred embodiment. Finally, the connections shown in the figures may be any type of physical or logical means of connecting computer systems known in the art. This includes, but is not limited to, direct connections, Internet connections, Intranet connections, Infrared (IR) and other forms of wireless connections. It is anticipated that many alternative methods and material for connecting computer systems will be readily adapted for use with the present invention. In sum, while several separate computer systems are disclosed herein (e.g. FIGS. 3 and 4), a computer system in accordance with the present invention may include any number or combination of computer systems. The figures herein are shown to illustrate salient aspects of the invention, and should not be construed to limit the invention to the particular configurations illustrated herein.

MULTIPLE USER ACCESS TO MULTIPLE SOFTWARE APPLICATIONS VIA A COMMON USER INTERFACE

Figure 10:
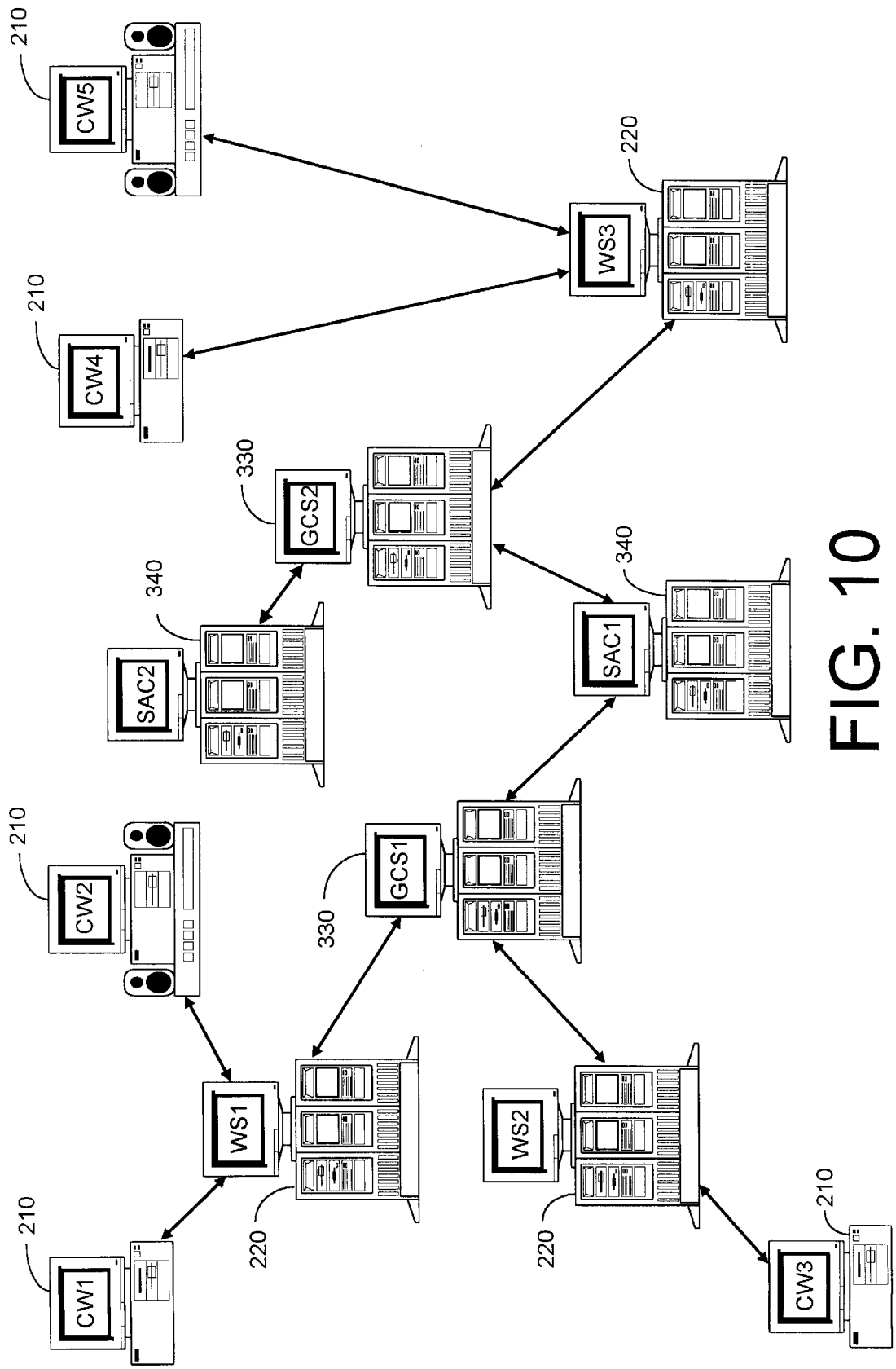
FIG. 10 is a block diagram of a preferred embodiment of the present invention when expanded to a multi-user environment.

Referring now to FIGS. 2 and 10, further advantages of the present invention become most apparent when multiple users access multiple software applications simultaneously via web browsers 212 on the WWW. Each web user will generally have a client workstation 210 that will be used to access the WWW. For the specific configuration of FIG. 10, client workstations 1 and 2 (CW1 and CW2) are coupled to web server 1 (WS1), and client workstation 3 is coupled to web server 2 (WS2). Client workstations CW4 and CW5 are coupled to web server 3 (WS3). Both web servers WS1 and WS2 are coupled to a gateway computer system (GCS), in this case, GCS1. As shown, WS3 is coupled to GCS2. GCS1 and GCS2 are both coupled to a software application computer 1 (SAC1). In addition, GCS2 is also coupled to a software application computer 2 (SAC2). Both SAC1 and SAC2 are running various software applications that web users might need to access via the WWW.

The present invention provides a common graphical user interface for each web client and manages all the accesses by all these client workstations (CW1-CW5) to the application software programs running on SAC1 and SAC2 in a manner that assures that the requested functions are performed as requested. The GCS provides the application gateway that directs traffic between the web clients and the software application. The security mechanism of the present invention works with the application software and requires userIDs and keys which are used to access authentication data for each of the various computer resources. By assigning unique identifiers to each conversation, the GCS can interact with each software application running on SACS using its native interface, and can then identify output from the software application and match it with the web client that requested the output. By using HTML templates and variables in accordance with the present invention, some web clients may actually be accessing information from more than one software application on different computer systems and may receive the requested data in a single web page. At any time, one of the web clients may suspend processing and cease providing input to a software application. By using the DISCONNECT API feature of the present invention, no computer time will be wasted uneccessarily.

CAR RENTAL EXAMPLE

Figure 23:
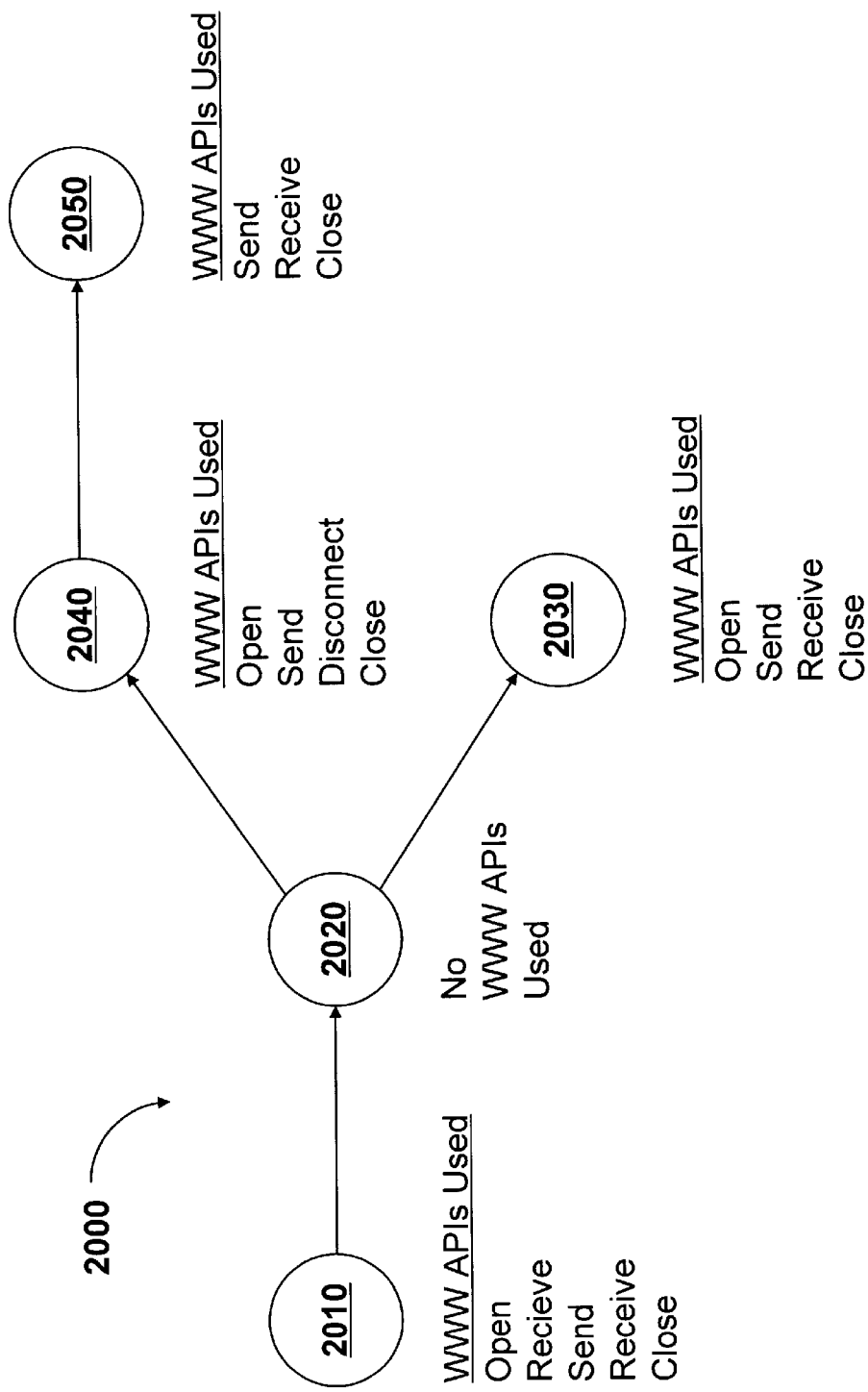
FIG. 23 is a process model diagram that describes a WWW transaction with a software application using a preferred embodiment of the present invention.

A specific example of a preferred embodiment of the present invention can be described in greater detail by using the situation where a person wants to rent a car by accessing FlowMark application software for a rental car agency over the WWW. Referring now to FIG. 23, a process model 2000 for the overall car rental example includes process steps 2010, 2020, 2030, 2040, and 2050. In process step 2010 of process model 2000, an activity program receives car rental information, locates the next reservation number, saves the reservation number to a file, returns the reservation number to the requester and sets the reservation number in the FlowMark output data container. Process step 2010 uses FlowMark Internet Connection WWW APIs and data container APIs. Process step 2020 is an activity program which determines if a car is available to fill the reservation. The subsequent path taken in Process Model 2000 is dependant upon the results of this determination. If a car is available to fill the reservation, then the next step in process model 2000 would be process step 2030. If, however, no car is available to fill the reservation request, the next step in the process model would be process step 2040. In process step 2030, an available car, which matches the car rental request, is identified and scheduled to fill the reservation request. In addition, the reservation confirmation number is generated and transferred to the requester. In process step 2040, the car rental agent has the option of deciding whether or not to try and find a rental car from another location to fill the reservation request. If the availability of a rental car at an alternative location is sought, then the next step in process model 2000 would be process step 2050. In process step 2050, an activity program is available for scheduling and moving a car from one location to another location to fill the reservation request. Process step 2050 presents a list of cars that are available at alternate locations so that the car rental agent can select an appropriate car to be moved. Each of these steps is described in greater detail below.

Referring now to FIG. 4 and FIG. 23, the person or user who wants to rent a car will access the WWW by using client workstation 210 which is running web browser 212. The user will enter the URL for the rental car agency and locate the home page site for the rental car agency using web browser 212. Then, the user will locate the appropriate area or page on the rental car agency's web site which has been previously set up to accept requests for renting cars. We assume for this example that there is a rental reservation form on the rental car agency's web site. After locating the car rental reservation form, the user will enter the information required by the car rental agency. This information would typically include items such as a customer identification number, password, the city where the car is to be rented, desired dates for renting the rental car, the specific type of car to be rented (i.e., make, model, and size), etc.

One example of the HTML that would generate a suitable rental reservation form or template is shown in FIG. 11. Assume that web server 222 receives an input from web browser 212 specifying the HTML template of FIG. 11 as the next output that needs to be sent back to the web browser 212. This specifying can be done in various ways, including the use of form inputs from the web browser 212. This form requires a user to input his or her member number, last name, first name, middle initial, origin city, state, start date, number of days, and car preference. Once the user has input this information, the user submits his or her information by clicking on a "submit" button on the rental reservation form. At this point, web server application 222 receives the data stream generated by the user request from web browser 212. One suitable format picks out all variables and other relevant information data and sends it to web server application 222 in a post data stream format, which would look like the data stream of FIG. 12. As explained above, this data stream may be presented to web server application 222 in many different data formats and the present invention is not limited to any specific data format. These activities are encompassed in process step 2010 of FIG. 23.

Web server application 222 examines the data stream from web browser 212 to determine what action should be taken to fulfill the user's request. In this specific example, a call to CGI 420 from the line in the HTML form that reads "<FORM ACTION="/cgi-prot/exmp5cgi.exe" METHOD= "POST"> tells web server application 222 that it needs to call the protected CGI called exmp5cgi.exe, which we assume is CGI 420. When web server application 222 sees this call to a protected CGI, it knows that authentication is required before web server application 222 grants access to CGI 420.

Because CGI 420 is protected, access to CGI 420 must be controlled to avoid unauthorized users from accessing FlowMark application 342 via the WWW. In response to the parameters in the HTML form that specify CGI 420, web server application 222 must authenticate the web user. This authentication requires the user to enter a userID and password and web server application 222 issues a REALM request to web browser 212. A REALM request is a well-known software security feature which requires the user to input a userID and password in order to gain access to CGI 420. Web browser 212 stores the userID and password received from the user, and sends this information to web server application 222. Web server application 222 uses the userID and password to authenticate the user before granting the user access to CGI 420. It should be noted that some future implementations of web browser 212 will most likely provide a mechanism for web browser 212 to insert some form of the authentication data into the data stream transmitted to web server application 222. All methods and techniques for gathering authentication data and transmitting it from web browser 212 to web server application 222 are within the scope of the present invention.

Once authenticated, web server application 222 passes control to CGI 420, which receives data from web browser 212. For this specific example, CGI 420 receives the data stream in "post" format via a standard input protocol "stdin". The post format is a data format description well known to those skilled in the art. Stdin is a file descriptor that reads post data. Although a current preferred embodiment of the invention uses the post data format description, any other data formats that may be used by web browser 212 and web server application 222 are contemplated and are within the scope of this invention. The post data for the rental reservation form that is transmitted from web browser 212 to CGI 420 for this example is shown in FIG. 12

Once CGI 420 receives the post data from web browser 212, it parses the data, and looks for workflow variables. In our example, workflow variables have a wf- prefix. The two hidden workflow variables are "wf-cgi-submit=2" and "wf-cgi-html=exm/smp/exmp5srk.html". The first of these, "wf-cgi-submit=2", tells CGI 420 that it needs to create and start a FlowMark process instance. The two non-hidden workflow variables are "wf-fmig-key" and "wf-api-proc-template="WWW.ReservationRequest". These variables indicate which process template should be created and started. Multiple variables in a single HTML template can be used to retrieve data from multiple applications. For example, an HTML template could be specified that includes three variables. One variable could specify a particular FlowMark process that is to be started while the other two variables are used to retrieve information from different software applications that are accessible by a FlowMark activity program. Upon submission of the HTML template to web server 222, the CGI parses the variables and delivers them to the FMIG. The FMIG then directs the software application to start the process specified by the wf variable and passes the two application variables to the appropriate software application. The software application would then retrieve the appropriate data from the applications corresponding to the variables. Thus, by using the appropriate HTML variables a web client is able to work with many different applications through a single web page. This interaction can be completely transparent to the web client or may be apparent from the interface web page.

Thus, by using HTML templates with substitution variables, a single relatively simple CGI module in conjunction with an FMIG can provide an effective interface between a web server and a plurality of software applications. This allows system operators to provide easily customizable web access to a plurality of software applications over the WWW without having to use multiple or excessively complex CGI modules. CGI 420 then sends the post data and the environment data to FMIG 430 along with other control information. Environment data is available through standard programming techniques which are well known to those skilled in the art and can be passed to CGI 420 as a standard "C" programming language parameter.

FMIG 430 directs the flow of information between CGI 420 and FlowMark application 342 by using FlowMark APIs 436 to communicate requests from CGI 420. These FlowMark APIs are standard APIs that ship with the FlowMark product, and need not be changed to accommodate the present invention. This is important because it allows the native command interface to FlowMark application 342 to remain unchanged even though a new web interface is being provided. Note that the command interface between FMIG 430 and FlowMark application 342 is one-way, i.e., FMIG 430 always invokes FlowMark APIs 436, but data and status information flows in both directions.

After receiving the data from CGI 420, FMIG 430 parses the data and locates the userID and key from the wf-fmig-key variable to determine whether there is a corresponding FlowMark userID and other FlowMark access information that provides the user access to FlowMark application 342. Assuming the userID and key has corresponding FlowMark access information, FMIG 430 then logs into FlowMark application 342 using this access information. FMIG 430 invokes one of FlowMark APIs 436 to create a process instance necessary to process the request submitted by the user. In this example, the request would create a process instance called "www_Reservation_Request." This process instance has been specifically designed to handle WWW car rental transactions. Then, using a different FlowMark API 436, FMIG 430 invokes or starts this process instance. FMIG 430 also saves the appropriate HTML variable information for the "wf-cgi-html" variable, which tells FMIG 430 which HTML to render after the workflow sequence has ended. The prefix to the FlowMark process www_Reservation_Request tells FMIG 430 that this process is web-enabled, meaning that an activity program 432 will use WWW APIs 434 to communicate with FMIG 430.

To assure that FMIG 430 can match up the process instance with the web browser that requested it, FMIG 430 generates and stores a "handle" for this web client. Depending on the process, the handle is some combination of the process instance name, the activity instance name, and the security data for the web client. This handle is a unique identifier for the web client. FMIG 430 then enters the handle, process instance, userID, etc. into its internal data cache. FMIG 430 then waits for a WWW API 334 to connect. At this point, CGI 420 is still connected to FMIG 430 via connection 316 and is waiting to receive the requested status or data from FMIG 430 to fill the user's car rental request.

When the car rental reservation process model was initially built, the first activity program 432 was identified and designated to run automatically whenever the FlowMark car rental reservation process model was invoked. This means that whenever FMIG 430 creates and starts a FlowMark instance of the car rental reservation process model, the first car rental reservation FlowMark activity program 342 will be automatically started by FlowMark application 342 In this specific example, there will be multiple related activity programs 432 that will work together to process the car rental request. The FlowMark workflow process language models the car rental request and reservation process and automates transactions where appropriate. To process the car rental request, FlowMark application 342 will create an instance of the car rental reservation process model in FlowMark database 438 and then check to see if the Program Execution Client (PEC) is active. The PEC is a supervisory program module that coordinates the operation and flow of activities in FlowMark application 342. Once the PEC is active, FlowMark application 342 dispatches the activity to the PEC, and updates FlowMark database 438 to indicate that the activity is running. Then, the PEC starts the activity program 432 which has been registered to the first activity in the process. The selected activity program 432 then begins to run. The number and nature of activity programs 432 necessary to process the web client's car rental request will depend on how the process model 440 was designed. For example, some process models 440 may model an activity as a completely automatic process which runs to completion without any human intervention. Alternatively, a process model 440 may require extensive human input and intervention before it finishes the model process. Regardless of design, each workflow process model 440 initiates the specific activity program 432 necessary to accomplish the designated task or tasks specified to completed the modeled process or procedure.

Each individual activity program 432 is a separate software module that is designed to accomplish a specific task or return some requested information, and then terminate. WWW APIs 434 allow FlowMark activity programs 432 to send and receive data and status to and from web clients via the WWW. WWW APIs 434 are always invoked by activity program 432, but data and status information flows in both directions between FMIG 430 and activity programs 432.

In order to process the rental car request of this example, multiple related activity programs 432 may be invoked to complete the workflow process specified in process model 440. For example, one activity program may be initiated to query FlowMark database 438 to determine if the person requesting the rental car is an existing customer of the car rental agency. If they are, then the customer identification number will match an existing account number in FlowMark database 438 and activity program 432 can proceed and process the car rental request. If, however, the person requesting the rental car is not an existing customer, a different activity program 432 may be initiated to communicate with the web client, gather the necessary information, and enter the web client's customer information into FlowMark database 438.

Next, once a valid customer identity has been established, another activity program 432 may be initiated which will determine if the request can be filled according to the customer's request. This would be encompassed in process step 2020 of FIG. 23. For example, is a car available on the requested date, in the requested city, in the requested size, etc.? Alternatively, the FlowMark process model may specify that the car rental request should be routed to a human agent for further processing. In that case, the car rental request would show up on a FlowMark task list for the agent. Alternatively, the entire process may be completely automated. In either case, the car rental agent or activity program 432 processes the web client's car rental request and if the desired car is available, FlowMark database 438 will be updated to indicate that the car has been "reserved." These activities would be accomplished in process step 2030 of FIG. 23. If, however, the desired car is not available, a new activity program 432 may be initiated to look for a car in an alternate location (process step 2040 of FIG. 23) and create a request from a human car rental agent to transfer the desired automobile from another location to the desired location (process step 2050 of FIG. 23). Some of these activity programs 432 are described in greater detail below.

In this example, once the car rental agent has approved the request and transferred the vehicle to the desired location, the car rental agent will provide an input to FlowMark application 342 and update the activity program 432. Once the rental car has been reserved in the system, a different activity program 432 may be initiated to generate a confirmation number for the customer and process the confirmation transaction with the customer. Each activity program 432 is designed to be an independent process which executes to conclusion and then quits.

At this point, activity program 432 uses FlowMark APIs 436 to retrieve any input data from the FlowMark input data container. The FlowMark data container is a FlowMark function that is defined when a FlowMark process model 440 is built. The FlowMark data container is accessible via FlowMark APIs 436 and is used as a storage location to store and pass status and information from one activity program 432 to the next activity program 432 in process model 440. Then, activity program 432 opens a conversation with the web client by issuing an Open to WWW API 434 via connection 428. Activity program 432 also includes information such as the process instance being executed, activity name, and FlowMark userID. This information is transmitted to FMIG 430 by WWW API 434. FMIG 430 matches the Open API with the appropriate web client by locating the requested process instance name in the internal data cache. FMIG 430 then generates a "conversation identifier" for this transaction. FMIG 430 saves the conversation identifier in its internal cache and transmits the conversation identifier to WWW API 434 as part of a response message. WWW API 434 detaches from FMIG 430 and returns the conversation identifier to activity program 432. From this point on, the conversation identifier is included on all WWW API 434 submissions between this web client and all activity programs 432 necessary to process the web client's request. The conversation identifier remains valid until the conversation is terminated by a Close API issued by activity program 432.

After receiving the conversation identifier from FMIG 430, activity program 432 then issues a Receive to WWW API 434. The Receive API is a request to FMIG 430 to obtain data from the web client. In this case, FMIG 430 has data from the web client waiting to submit to activity program 432. This is the same web client data that CGI 420 sent to FMIG 430 earlier in the process. FMIG 430 sends the post data and environment data to the Receive WWW API 434, which relays the data to activity program 432. Activity program 432 takes the appropriate steps to process the data and fill the request.

At this point in the process, activity program 432 will also issue a Send to WWW API 434 that sends a reservation confirmation HTML screen to the web client at client workstation 210. The Send API generates a send request to FMIG 430 and sends the HTML data necessary to render the reservation confirmation screen. FMIG 430 matches the included conversation identifier with the web client handle (which are stored together in the internal data cache) and transmits the HTML data from activity program 432 along with the data type and the handle to CGI 420 which is still attached to FMIG 430 awaiting input. Activity programs 432 will generate the data type "HTML template" so that CGI 420 will be able to parse the original HTML template and replace the appropriate HTML substitution variables with the HTML data transmitted by activity programs 432. Alternatively, activity program 432 could transmit MIME, URL or HTML template data to CGI 420. At this point, CGI 420 detaches from FMIG 430 and starts processing the received data. FMIG 430 then responds to the WWW APIs 434 with an OK return code in a response message. WWW APIs 434 also detach from FMIG 430 and generate a return code to activity programs 432. In general, WWW APIs 434 detach from FMIG 430 after each WWW API 434 is invoked.

An example of the HTML code for the reservation confirmation template is shown in FIG. 13. Note that variable wf-act-outmsg is a substitution variable that will be replaced by the confirmation number in the HTML screen displayed by web browser 212. The HTML code after CGI 420 processes the data received from FMIG 430 is shown in FIG. 14. The HTML code shown in FIG. 14 is the code that web server application 222 will render and that web browser 212 displays on client workstation 210. Note that the HTML code in FIG. 14 contains the customer's reservation number. This time, since CGI 420 and the web client have already established a conversation, and since CGI 420 is still active from the first time it was invoked, there is no need to authenticate the web client. CGI 420 inserts the hidden variable, "wf-fmig-handle" along with the confirmation number and also inserts the wf-fmig-key from the first HTML screen into the HTML code, which allows subsequent HTML pages to contain embedded data that authorizes the page to access FlowMark 450. The substitution of HTML variables demonstrated in this example can be extended to include substitution/replication of JAVAScript variables and parsing/inserting JAVAScript templates. The present invention is not limited to HTML variable substitution.

During the processing of the reservation confirmation template, activity program 432 has issued a Receive API to WWW APIs 434 which acts as a confirmation message for activity program 432 to ensure that the customer has received and viewed the confirmation number. The web client then clicks on the "submit" button when they have received and recorded their confirmation number. This data is transmitted, as before to web server application 222 along with the web userID and password which have been retained by web browser 212. Web server application 222 uses this information to once again authenticate the web client to CGI 420. Web server application 222 invokes CGI 420 with the same HTML code as before; <FORM ACTION="/cgi-prot/exmp5cgi.exe" METHOD="POST">. CGI 420 receives the post data from web browser 212. In this example, web browser 212 would format the data as "form-urlencoded media type." The data would appear similar to that shown in FIG. 15. The wf-cgi-submit value of 13 is a command to pass the data to an activity program. FMIG 430 retrieves the wf-fmig-key and checks the key from the post data and web userID from the environment data to ensure that the web client is authorized. FMIG 430 matches the wf-fmig-handle with a conversation identifier from the internal data cache and checks to see if WWW API 434 has connected. If WWW API 434 has not yet connected, FMIG 430 will simply wait. CGI 420 remains connected to FMIG 430, waiting for a response. Once the Receive WWW API 434 has connected to FMIG 430, FMIG 430 uses the conversation identifier to match the Receive API to the appropriate web client and transmits the post data and environment data to WWW API 434 which, in turn passes this data to activity program 432. Activity program 432 processes the data and closes the conversation using the Close WWW API. The Close API is sent to FMIG 430 along with the conversation identifier, process instance name, and other pertinent data. FMIG 430 processes the close request and sends a response message to WWW APIs 434, which generate a return code to activity programs 432 to verify that the conversation has ended.

FMIG 430 then retrieves the stored variable values from the internal data cache and transmits the data to CGI 420. CGI 420 receives the data and variables and detaches from FMIG 430. CGI 420 then contacts web server application 222 and transmits the variables and data and directs the web server application to render the specified HTML to web browser 212.

At this point, interaction with the user regarding the car rental request has been completed. However, there are other activity programs 432 mentioned above which may have been completed in the interim. In addition, other processes may need to be completed and other activity programs 432 may be activated to accomplish these processes. In this example, one activity program 432 has been interacting with the user and has transmitted the data gathered from the user to the FlowMark data container. The data in the FlowMark data container is now the input for another activity program 432 in FlowMark process model 440. Some of the other activity programs 432 are described below.

Once any activity program 432 has finished operation, control passes back to the PEC. The PEC returns to Flow-Mark and FlowMark database 438 is updated to indicate one activity program 432 is completed and that the next activity program 432 to complete the process can be initiated. If the next activity program 432 is an automatically executing activity program 432, FlowMark 432 will create an instance of the activity in FlowMark database 438, check to see if the PEC is active, dispatch the activity to the PEC, and update FlowMark database 438 to indicate that the activity is running. The PEC starts the activity which has been registered as the next activity to run and the appropriate activity program 432 will run to completion.

As noted above, some of the activities required to process the car rental request may be modeled so as to require human interaction or intervention. For example, if necessary, a human car rental agent may be required to verify the reservation request for a car. Alternatively, it may be that the requested rental car is not available at the requested location and a human agent may be contacted to relocate an appropriate car from an alternative location. There are two possible outcomes of the web client's request for a car, either the car rental agency has the requested car available in the destination city on the requested dates or it does not. After a query to the FlowMark database has checked the availability, the correct activity program will be initiated.

In this example, the activity program 432 would generate an item for a FlowMark user's work list and the FlowMark user, in this case the car rental agent, will have to start the activity manually. The car rental agent would use web browser 212 to access their FlowMark runtime client web page. The HTML code necessary to generate an appropriate web page for the car rental agent would be similar to the code shown in FIG. 16. The car rental agent enters their key, selects "Work with Work Items" and clicks on the submit button. This radio button is associated with a specific HTML template, exmp5ewi.htm, because of the line of HTML in FIG. 16 that reads <INPUT TYPE="radio"NAME="wf-cgi-html"VALUE="/exm/html/exmp5ewi.htm" CHECKED>.

Once again, as previously described, web server application 222 receives the post data stream generated from web browser 212. Since CGI 420 is protected, another REALM request must be issued and answered. As before, the REALM request requires the car rental agent to input a password and userID. It should be noted that some future implementations of web browser 212 will most likely provide a mechanism for web browser 212 to insert some form of the authentication data into the data stream transmitted to web server application 222. All methods and techniques for gathering authentication data and transmitting it from web browser 212 to web server application 222 are within the scope of the present invention. In general, each web runtime client should know their userID and password on the web. In either case, web browser 212 will store the web userID and the password and send the information to web server application 222. As before, web server application 222 uses the web userID and the password to authenticate the web client and gain access to CGI 420. After the car rental agent has been authenticated, CGI 420 is invoked through the following HTML language from the example above:<FORM ACTION="/cgi-prot/exmp5cgi.exe"METHOD="POST">. CGI 420 receives the post data stream from web server application 222 via stdin. The data stream will typically look like the example shown in FIG.14.

Because the submit value in the data stream is 0, CGI 420 will retrieve the specified template (exmp5ewi.htm), parse the template for HTML variables, and pass the parsed variables together with the environment data and control information to FMIG 430. An example of the HTML code used to generate the template before CGI 420 begins processing would look similar to FIGS. 18a and 18b.

FMIG 430 retrieves the car rental agent's key value (webfmagent) and web userID from the data stream and uses that information to find a FlowMark userID in FlowMark database 438 that the car rental agent is authorized to use. Since the car rental agent is not already logged into Flow-Mark 450, FMIG 430 logs into FlowMark 450 using the correlating FlowMark information in the FlowMark database 438. FMIG 430 uses FlowMark APIs 436 to retrieve the information associated with the car rental request that was input earlier by the user (i.e., wf-api-item-id, wf-api-item-descrip, wf-api-item-state, etc.) and formats the data into a message for CGI 420 which is still connected and waiting for data from FMIG 430. The data is passed through FMIG 430 to CGI 420. Once the data has been transmitted to CGI 420, CGI 420 disconnects from FMIG 430 and begins to process the received data. CGI 420 will take the information from FMIG 430 and process the variables, putting the information into the appropriate template that will be displayed on client workstation 210. An example of the HTML code after CGI 420 has completed processing the template is shown in FIGS. 19a, 19b and 19c. The HTML code shown in FIGS. 19a, 19b, and 19c is used to render an output screen of work items on the work list for the car rental agent on client workstation 210. The car rental agent will view the list of work items generated by FlowMark 450 and displayed by web browser 212. The car rental agent will select one of the displayed work items and click on the "start work item" button and then on the "perform action" button. These actions by the car rental agent will generate a data stream to web server application 222 that includes the web userID and password information. The web userID and password have been retained by web server application 222 and the car rental agent need not re-enter this information. Web server application 222 uses the stored userID and the password to authenticate the car rental agent and gain access to CGI 420. Web server application 222 invokes CGI 420 with HTML code similar to that used before; <FORM ACTION="/cgi-prot/exmp5cgi.exe"METHOD="POST"> and CGI 420 receives the post data from web browser 212. The post data will be received by CGI 420 via stdin and will be similar to that shown in FIG. 20.

In this case, since the car rental agent has submitted a request to start a work item, the value of the submit variable is equal to 3. CGI 420 will retrieve the specified template (in this case exmp5ewi.htm), parse the template for HTML variables, and pass these variables along with the data stream, environment data and control information to FMIG 430. While control passes to FMIG 430 at this point, CGI 420 remains connected to FMIG 430 and waits for data to be returned from FMIG 430. FMIG 430 authenticates the car rental agent using the variables transmitted by CGI 420. Since the car rental agent is already logged onto FlowMark 450, FMIG 430 need not log the car rental agent on again. FMIG 430 parses the data stream; sees the request to start a work item, (wf-api-item) and issues a FlowMark API 436 to start the processing the work item. Since the work item has been transmitted in a WWW context with HTML variables, FMIG 430 knows the activity program will use WWW APIS 434 to have a conversation with the web client. FMIG 430 will generate a handle for this web client and will enter the handle, process instance name, activity name, userID, etc. into the internal cache. FMIG 430 also saves the HTML variable information so that it can be restored later when the conversation has taken place. FMIG 430 will then wait for WWW APIs 434 to connect.

In response to the FlowMark API 436 that starts the requested work item (wf-api-item), FlowMark will create an instance of the activity in FlowMark database 438, check to see if the PEC is active, dispatch the activity to the PEC, and update FlowMark database 438 to indicate that the activity is running. The PEC will start the activity program 432 which has been registered to the next activity in this process. The activity program will then run to completion.

Activity program 432 will use FlowMark APIs to retrieve any input data from the FlowMark input data container. The activity program will open a conversation with the web client by issuing, an Open API to WWW APIs 434. The Open API generates an Open request message for FMIG 430 and includes information such as the process instance and activity name and FlowMark userID. FMIG 430 takes this information, matches up the web client by finding the appropriate process instance, activity name, and userID in the internal data cache. As before, FMIG 430 also generates a conversation identifier and stores the identifier in its internal cache. FMIG 430 transmits the conversation identifier to WWW APIs 434 in a response message and the WWW APIs 434 detach from FMIG 430 and return the conversation identifier to activity program 432. From this point on, the conversation identifier is included in all WWW API 434 submissions dealing with this web client and this process instance. The conversation identifier remains valid until the conversation is closed. Activity program 432 issues a Send API to WWW APIs 434 to generate an HTML screen to the web client. Activity program 432 specifies the data type as HTML template so that CGI 420 knows to parse the template and replace the variables with the data sent by activity program 432. Activity programs 432 specify the location of the template and the text to be substituted for each variable.

The Send API generates a send request to FMIG 430 and sends the data. FMIG 430 matches the included conversation identifier with the appropriate web client and transmits the data from the activity program 432, the data type and the handle to the still-attached CGI 420. At this point, CG1 420 detaches from FMIG 430 and starts to process the received data. FMIG 430 responds to the WWW API 434 and WWW API 434 also detaches from FMIG 430. WWW APIs 434 send a return code to activity program 432. CGI 420 will use the data transmitted from FMIG 430 to create a screen containing information about cars that are available to fill the customer's request. In addition, since CGI 420 is in communication with web server application 222, CGI 420 will insert a hidden variable, the "wf-fmig-handle", and the wf-fmig key from the first HTML screen into the HTML code for the new screen. CGI 420 then parses the template and processes the "wf-" variables, filling information into the appropriate locations. The HTML code in the template file would look similar to the HTML code shown in FIG. 21. After CGI 420 finishes processing, the HTML code in the file would look like the HTML code in FIG. 22. This is the HTML code that web server application 222 will use to render the car rental agent's screen on client workstation 210. In the meantime, activity program 432 has issued a Receive WWW API 434 to receive the data from the web client. The car rental agent selects which car to reserve in order to fill this car rental request and clicks on the "submit process" button. The communication process between web browser 212, web server application 222, CGI 420, FMIG 430 and FlowMark 450 takes place as explained above. Eventually, the selected car will be updated in FlowMark database 438 and the conversation will be terminated. Since the car rental reservation process instance is now complete, FlowMark 450 removes the process instance from FlowMark database 438.

A similar sequence of events would transpire for the situation where no rental car is available at the requested location. The only difference is that in this case, the car rental agent's screen would not contain information on available cars since there is no qualifying match for a car at the requested city. The screen would contain an option to move a car that matches the customer's request from an alternative location.

Meanwhile, activity program 432 has issued a Disconnect API. The Disconnect API generates a disconnect request message for FMIG 430 and includes information such as the conversation identifier, process instance, activity name and FlowMark userID. FMIG 430 takes this information, locates the corresponding entry in its internal cache and records all of this information along with the "disconnect" status for activity program 432. FMIG 430 transmits an OK response message to WWW API 43, which detaches from FMIG 430 and sends a return code to activity program 432. Activity program 432 checks the return code and verifies that the disconnect API was successfully recorded. Activity program 432 saves the conversation identifier and status information in a local database for restoring the disconnected process at a later time. Since this activity has progressed as far as possible without actually completing, control is returned to the PEC. Since the activity did not complete, the PEC will update FlowMark database 438 to show that the activity is ready to be started again. As far as FlowMark is concerned, this is a "manual start" activity. Since this activity is ready and manual start, FMIG 430 can issue a FlowMark API 436 at a later time to re-start the activity when the data is available from the car rental agent. The car rental agent selects that they wish to move a car from an alternate location to fill the car rental request and clicks on "submit." The process of data transfer and web client authentication proceed as previously described. This time, when FMIG 430 checks the conversation identifier, it will notice that the status of the activity is "disconnected." FMIG 430 issues FlowMark API 436 to re-start the activity program 432. Activity program 432 is thus re-started FlowMark 450 creates the process instance and updates database 438 as before. The PEC starts the activity program 432 and the necessary data is transferred from FMIG 430. Activity program 432 can now run to completion. It is possible to determine which rental car should be moved from which location and to transmit this data from the car rental agent to FlowMark 450 by a similar sequence and series of communications.

As can be seen from the examples presented above, providing a common user interface for accessing various software applications over the WWW allows for increased productivity with greater efficiency. With a reduction in the both the length and amount of training required for users to gain access to various software applications, the flexibility of using more software applications also becomes available. All of these advantages allow for businesses to be more competitive and successful in the marketplace.

While the invention has been particularly shown and described with reference to preferred embodiments thereof, it will be understood by those skilled in the art that various changes in form and details may be made therein without departing from the spirit and scope of the invention.

We claim:

1. A computer system that provides a common user interface for communicating between a plurality of web browsers and a software application over the World-Wide Web, the computer system comprising:

at least one Central Processing Unit (CPU);

a memory coupled to the CPU; and a transaction support mechanism, the transaction support mechanism residing in the memory and being executed by the at least one CPU, wherein the transaction support mechanism is capable of receiving and transmitting data to and from the plurality of web browsers via the common user interface, the transaction support mechanism using an identifier mechanism to identify and track the data.

2. The computer system of claim 1, further comprising a security mechanism, the security mechanism residing in the memory and being executed by the at least one CPU, the security mechanism coupled to and providing an interface between the software application and the plurality of web browsers, the security mechanism receiving user input from the plurality of web browsers, the security mechanism retrieving authentication parameters for the software application corresponding to the received input.

3. The computer system of claim 1, further comprising an interface mechanism, the interface mechanism comprising a gateway mechanism for handling at least one variable, the gateway mechanism residing in the memory and being executed by the at least one CPU, the gateway mechanism comprising a universal common gateway interface for communicating between the plurality of web browsers and the software application without requiring reprogramming for the software application.

4. The computer system of claim 1, further comprising a disconnect mechanism, the disconnect mechanism residing in the memory and being executed by the at least one CPU, the disconnect mechanism storing state data and a conversation identifier relating to each conversation between one of the plurality of web browsers and a software application process when the software application process is suspended such that the data can be retrieved when the software application process is resumed.

5. The computer system of claim 1, further comprising:

a security mechanism, the security mechanism residing in the memory and being executed by the at least one CPU, the security mechanism coupled to and providing an interface between the software application and the plurality of web browsers, the security mechanism receiving user input from the plurality of web browsers, the security mechanism retrieving authentication parameters for the software application corresponding to the received input;

an interface mechanism, the interface mechanism comprising a gateway mechanism for handling at least one variable, the gateway mechanism residing in the memory and being executed by the at least one CPU, the gateway mechanism comprising a universal common gateway interface for communicating between the plurality of web browsers and the software application without requiring reprogramming for the software application; and a disconnect mechanism, the disconnect mechanism residing in the memory and being executed by the at least one CPU, the disconnect mechanism storing state data and a conversation identifier relating to each conversation between one of the plurality of web browsers and a software application process when the software application process is suspended such that the data can be retrieved when the software application process is resumed.

6. The computer system of claim 1, wherein the transaction support mechanism further comprises a mechanism for communicating with a native interface to the software application.

7. The computer system of claim 1 wherein the transaction support mechanism comprises:

an application gateway in communication with the web server application and the software application, the application gateway residing in the memory and being executed by at least one of the plurality of CPUs, the application gateway including the identifier mechanism, the identifier mechanism generating an identifier for each of the plurality of web browsers and routing data from the software application to the selected one of the plurality of web browsers that correspond to the identifier.

8. The computer system of claim 7 wherein the application gateway processes data received from the plurality of web servers and processes data received from the application program.

9. The computer system of claim 1 wherein the software application is a process engineering software application.

10. The computer system of claim 1 further comprising at least one activity program interface (API) in communication with at least one activity program that executes under the direction of the software application, the at least one activity program interface communicating between the at least one activity program and the application gateway.

11. A computer system that provides a common user interface for communicating between a web browser and a software application over the World-Wide Web, the computer system comprising:

a plurality of Central Processing Units (CPUs);

a memory coupled to the plurality of CPUs;

each of the plurality of web browsers residing in the memory and being executed by at least one of the plurality of CPUs;

a web server application in communication with at least one of the plurality of web browsers, the web server application residing in the memory and being executed by at least one of the plurality of CPUs; and the software application residing in the memory and being executed by at least one of the plurality of CPUs; and an application gateway in communication with the web server application and a native interface to the software application, the application gateway residing in the memory and being executed by at least one of the plurality of CPUs, the application gateway including:

an identifier mechanism, the identifier mechanism generating an identifier for each of the plurality of web browsers and routing data from the software application to the selected one of the plurality of web browsers that correspond to the identifier.

12. The computer system of claim 11 wherein the application gateway processes data received from the web server application and the application program.

13. The computer system of claim 11 wherein the software application is a process engineering software application.

14. The computer system of claim 11 further comprising at least one activity program interface (API) in communication with at least one activity program that executes under the direction of the software application, the at least one activity program interface communicating between the at least one activity program and the application gateway.

15. The computer system of claim 11 wherein the web server application comprises:

an authenticator, the authenticator determining from authentication data passed from one of the plurality of web browsers whether the selected web browser is authorized to access the web server application; and wherein the web server processes data received from the plurality of web browsers and data received from the application gateway.

16. The computer system of claim 11 wherein the web browser is executed on a client workstation by at least one of the plurality of CPUs.

17. The computer system of claim 11 wherein the web server application is executed on a web server computer by at least one of the plurality of CPUs.

18. The computer system of claim 11 wherein the application gateway is executed on the web server computer by at least one of the plurality of CPUs.

19. The computer system of claim 11 wherein the application gateway is executed on a first computer by at least one of the plurality of CPUs.

20. The computer system of claim 11 wherein the software application is executed on a second computer by at least one of the plurality of CPUs.

21. The computer system of claim 11 wherein the application gateway is executed on the second computer by at least one of the plurality of CPUs.

22. A program product for providing a common user interface for communicating between a plurality of web browsers and a software application, the program product comprising:

(1) an application gateway in communication with the plurality of web browsers and the software application, the application gateway comprising:

an identifier mechanism, the identifier mechanism generating an identifier for each of the plurality of web browsers and routing data from the software application to a selected one of the plurality of web browsers that correspond to the identifier via the common user interface; and a mechanism for communicating with a native interface to the software application; and (2) signal bearing media bearing the application gateway.

23. The program product of claim 22 wherein the signal bearing media comprises recordable media.

24. The program product of claim 22 wherein the signal bearing media comprises transmission media.

25. The program product of claim 22 wherein the software application is a process engineering software application.

26. The program product of claim 22 further comprising at least one activity program interface (API) in communication with at least one activity program that executes under the direction of the software application, the at least one activity program interface communicating between the at least one activity program and the application gateway.

27. A computer-implemented method for providing a common user interface for communicating between a web browser and a software application over the World-Wide Web, the method comprising the steps of:

providing a plurality of Central Processing Units (CPUs);

providing a memory coupled to the plurality of CPUs;

executing at least one of the plurality of web browsers residing in the memory by at least one of the plurality of CPUs;

providing a web server application residing in the memory and being executed by at least one of the plurality of CPUs;

providing a software application residing in the memory and being executed by at least one of the plurality of CPUs;

providing an application gateway residing in the memory and being executed by at least one of the plurality of CPUs;

a selected one of the plurality of web browsers initiating an access to the software application by sending authentication data and environment data to the web server application;

processing the environment data if the authentication data authorizes the selected web browser to access the web server application;

outputting the processed environment data to the application gateway;

generating an identifier corresponding to the selected web browser and a desired process to be executed by the software application;

providing a security mechanism, the security mechanism residing in the memory and being executed by the at least one CPU, the security mechanism receiving user input from the web browser, the security mechanism retrieving authentication parameters for the software application corresponding to the received input providing an interface mechanism residing in the memory and being executed by the at least one CPU, wherein the interface mechanism receives and transmits variables and templates between the web browser and the software application; and providing a disconnect mechanism residing in the memory and being executed by the at least one CPU, the disconnect mechanism storing state and a conversation identifier relating to a conversation between the web browser and the software application when the conversation is suspended such that the state data can be retrieved when the conversation is resumed executing the desired process by the software application;

returning the results of executing the desired process to the application gateway with the identifier;

determining which of the plurality of browsers should be sent the results based on the identifier;

sending the results from the application gateway to the web server application; and sending the results from the web server to the selected one web browser corresponding to the identifier.

28. The method of claim 27 wherein the software application is a process engineering software application.

29. A system for providing a common user interface for communicating between a web browser and a software application over the World-Wide Web, the system comprising:

a client workstation running the web browser;

a web server computer running a web server application;

a first computer running an application gateway;

a second computer running the software application;

a communication mechanism between the web browser and the web server application which allows data to be transmitted between the web browser and the web server application;

a communication mechanism between the web server application and the application gateway which allows data to be transmitted between the web server application and the application gateway;

a communication mechanism between the application gateway and the software application which allows data to be transmitted between the application gateway and the software application;

an interface mechanism wherein the interface mechanism receives and transmits variables and templates between the web browser and the software application;

a security mechanism coupled to and providing an interface between the web browser and the software application;

a disconnect mechanism wherein the disconnect mechanism stores state and a conversation identifier relating to a conversation between the web browser and the software application when the conversation is suspended such that the state data can be retrieved when the conversation is resumed executing the desired process by the software application; and a plurality of application programming interfaces that allow the web browser to communicate with the software application over the World-Wide Web.

30. The system of claim 29 wherein the software application is a process engineering software application.

31. The system of claim 29 wherein the web server computer comprises the first computer.

32. The system of claim 29 wherein the first computer comprises the second computer.

* * * * *